(12) United States Patent
Choi et al.

(10) Patent No.: US 9,455,857 B2
(45) Date of Patent: *Sep. 27, 2016

(54) METHOD FOR TRANSMITTING DATA UNIT IN WIRELESS LAN SYSTEM AND DEVICE FOR SUPPORTING SAME

(71) Applicant: LG Electronics Inc., Seoul (KR)

(72) Inventors: Jinsoo Choi, Anyang-si (KR);
Seunghee Han, Anyang-si (KR);
Jinsam Kwak, Anyang-si (KR);
Yongho Seok, Anyang-si (KR); Jeongki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/378,117

(22) PCT Filed: Jan. 29, 2013

(86) PCT No.: PCT/KR2013/000691
§ 371 (c)(1),
(2) Date: Aug. 12, 2014

(87) PCT Pub. No.: WO2013/147413
PCT Pub. Date: Oct. 3, 2013

(65) Prior Publication Data
US 2015/0009978 A1 Jan. 8, 2015

Related U.S. Application Data

(60) Provisional application No. 61/617,672, filed on Mar. 30, 2012.

(51) Int. Cl.
*H04W 4/00* (2009.01)
*H04L 27/26* (2006.01)
*H04L 25/03* (2006.01)
*H04L 25/02* (2006.01)
*H04W 84/12* (2009.01)
*H04W 88/08* (2009.01)

(52) U.S. Cl.
CPC ....... *H04L 27/2613* (2013.01); *H04L 25/0226* (2013.01); *H04L 25/03866* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 7,535,972 B2 | 5/2009 | Hammetschomidt | |
| 9,014,286 B2 * | 4/2015 | Choi et al. | 375/260 |
| 2005/0135517 A1 | 6/2005 | Coffey et al. | |
| 2008/0013504 A1 * | 1/2008 | Nishibayashi et al. | 370/338 |
| 2010/0260159 A1 | 10/2010 | Zhang et al. | |
| 2011/0026623 A1 | 2/2011 | Srinivasa et al. | |

(Continued)

FOREIGN PATENT DOCUMENTS

| | | |
|---|---|---|
| KR | 10-2011-0051129 A | 5/2011 |
| KR | 10-2011-0093559 A | 8/2011 |
| WO | 20101093897 | 8/2010 |

*Primary Examiner* — Kevin C Harper
(74) *Attorney, Agent, or Firm* — Dentons US LLP

(57) ABSTRACT

Provided is a method for transmitting a data unit performed by a transmitter in a wireless LAN system. The method comprises: generating a data unit, wherein the data unit includes a data field which contains data to be transmitted by a transmitter; generating at least one data symbol for the data field; and transmitting the at least one data symbol, wherein two pilot tones are inserted into each data symbol, and pilot values and scrambling values are applied to the pilot tones.

8 Claims, 20 Drawing Sheets

(56) References Cited

U.S. PATENT DOCUMENTS

| | | |
|---|---|---|
| 2011/0051706 A1* | 3/2011 | Schmidl et al. ............... 370/338 |
| 2011/0228875 A1 | 9/2011 | Trachewsky et al. |
| 2013/0121348 A1* | 5/2013 | Zhang et al. ................. 370/474 |
| 2013/0177090 A1* | 7/2013 | Yang et al. ................... 375/260 |
| 2013/0215993 A1* | 8/2013 | Taghavi Nasrabadi et al. ............................ 375/295 |

* cited by examiner

FIG. 10
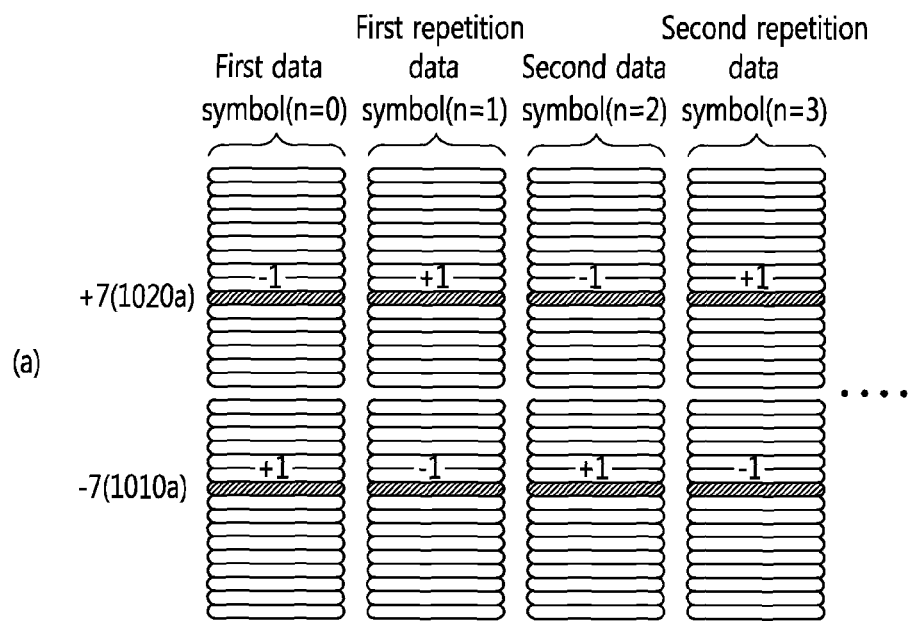
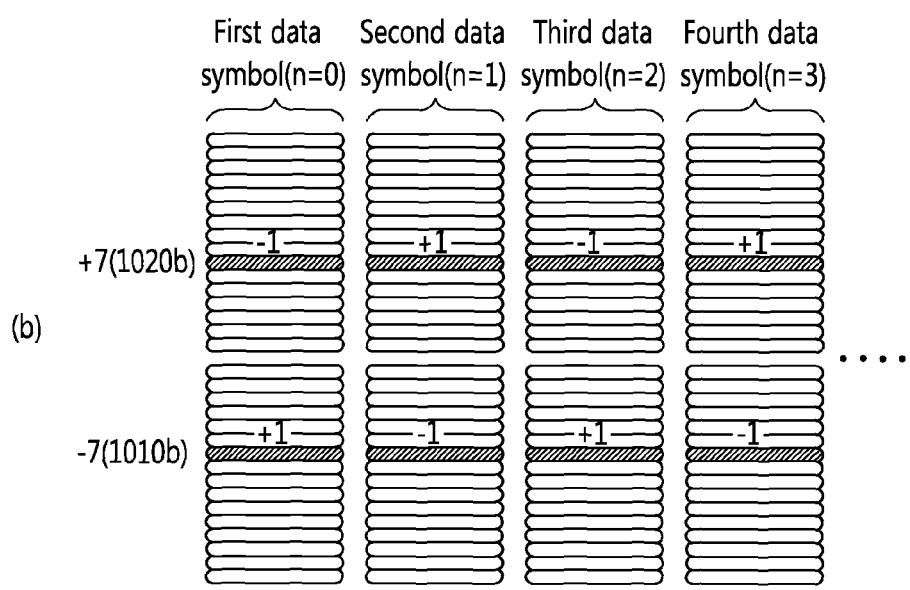

METHOD FOR TRANSMITTING DATA UNIT IN WIRELESS LAN SYSTEM AND DEVICE FOR SUPPORTING SAME

This application is a 35 USC §371 National Stage entry of International Application No. PCT/KR2013/000691 filed on Jan. 29, 2013, and claims priority to U.S. Provisional Application No. 61/617,672 filed on Mar. 30, 2012, which are hereby incorporated by reference in their entireties as if fully set forth herein.

BACKGROUND OF THE INVENTION

1. Field of the Invention

The present invention relates to wireless communication, and more particularly, to a method for transmitting a data unit in a wireless local area network system and a device for supporting the same.

2. Related Art

In recent years, with the development of information and communication technology, various wireless communication technologies have been developed. Among them, a Wireless Local Area Network (WLAN) is a technology that enables a portable terminal such as a Personal Digital Assistant (PDA), a laptop computer, and a Portable Multimedia Player (PMP) to access an Internet in a wireless scheme at a house, a business, or a specific service providing zone.

Unlike an existing wireless LAND system for supporting High Throughput (HT) and High Throughput (VHT) using 20/40/80/160/80+80 MHz bandwidth of 2 GHz and/or 5 GHz band, a wireless LAN system capable of being operated at a band less than 1 GHz is suggested. If the wireless LAN system is operated at a band less than 1 GHz, service coverage by an access point AP may be expanded as compared with an existing LAN system. Accordingly, one AP manages more STAs.

Meanwhile, according to variation in a frequency band and a bandwidth of a used wireless channel, and rapid increase of service coverage due to this, various implementation examples with respect to a format of a new data unit usable in a next generation wireless LAN system and a transmitting method according thereto have been provided. According to the varied wireless environment and introduction of a varied format of the data unit, there is a need to suggest a method of transmitting data units capable of reducing performance degradation of a wireless LAN system and providing more efficient data processing performance.

SUMMARY OF THE INVENTION

The present invention provides a method for transmitting data units in a wireless local area network system and a device for supporting the same.

In an aspect, a method for transmitting a data unit in a wireless local area network system is provided. The method performed by a transmitter includes generating a data unit, the data unit including a data field which contains data to be transmitted by the transmitter, generating at least one data symbol for the data field, and transmitting the at least one data symbol. Two pilot tones are inserted into each data symbol, and pilot values and scrambling values are applied to the two pilot tones.

The data unit may further include a signal field having control information for the data field. The method may further include generating at least one signal symbol with respect to the signal field, and transmitting the at least one signal symbol before transmitting the at least one data system.

The at least one data symbol and the at least one signal symbol may independently be indexed.

The pilot value may be determined based on a symbol index of a corresponding data symbol.

The scrambling value may be determined based on the symbol index of the corresponding data symbol and a specific offset value.

The specific offset value may determined based on the number of the at least one signal symbol.

The scrambling value may be determined based on the symbol index of the corresponding data symbol.

The at least one data symbol and the at least one signal symbol may be simultaneously indexed.

The scrambling value may be determined based on the symbol index of the corresponding data symbol.

The pilot value may be determined based on the symbol index of the corresponding data symbol and a specific offset value.

The specific offset value may be determined based on the number of the at least one signal symbol.

The at least one signal symbol may be transmitted before the at least one data symbol.

The at least one data symbol and the at least one signal symbol may be transmitted through a 1 MHz bandwidth of a frequency band of 1 GHz or less.

A wireless device operated in a wireless local area network system includes a transceiver configured to transmit and receive a wireless signal, and a processor functionally connected to the transceiver and configured to generate a data unit, the data unit including a data field which contains data to be transmitted by the wireless device, generate at least one data symbol for the data field, and transmit the at least one data symbol. Two pilot tones are inserted into each data symbol, and pilot values and scrambling values are applied to the two pilot tones . . . .

A scrambling sequence is a pilot tone of an OFDM symbol which is transmitted for a data unit. Accordingly, performance degradation due to a line can be prevented by preventing a line of a specific frequency component from being generated to a time domain axis.

When a midamble is applied to the data unit in order to compensate for variation in a channel due to Doppler frequency shift, a pilot value and the scrambling sequence are applied to signal fields included in the data unit and a symbol transmitted for a data field. Accordingly, unlike an existing data unit, performance degradation is prevented by applying a scrambling sequence suitable for a data unit to which the midamble is applied, and the whole performance of a wireless LAN can be improved.

BRIEF DESCRIPTION OF THE DRAWINGS

FIG. 10 is a diagram illustrating a pilot sequence according to an OFDM symbol according to an embodiment of the present invention.

DESCRIPTION OF EXEMPLARY EMBODIMENTS

Figure 1:
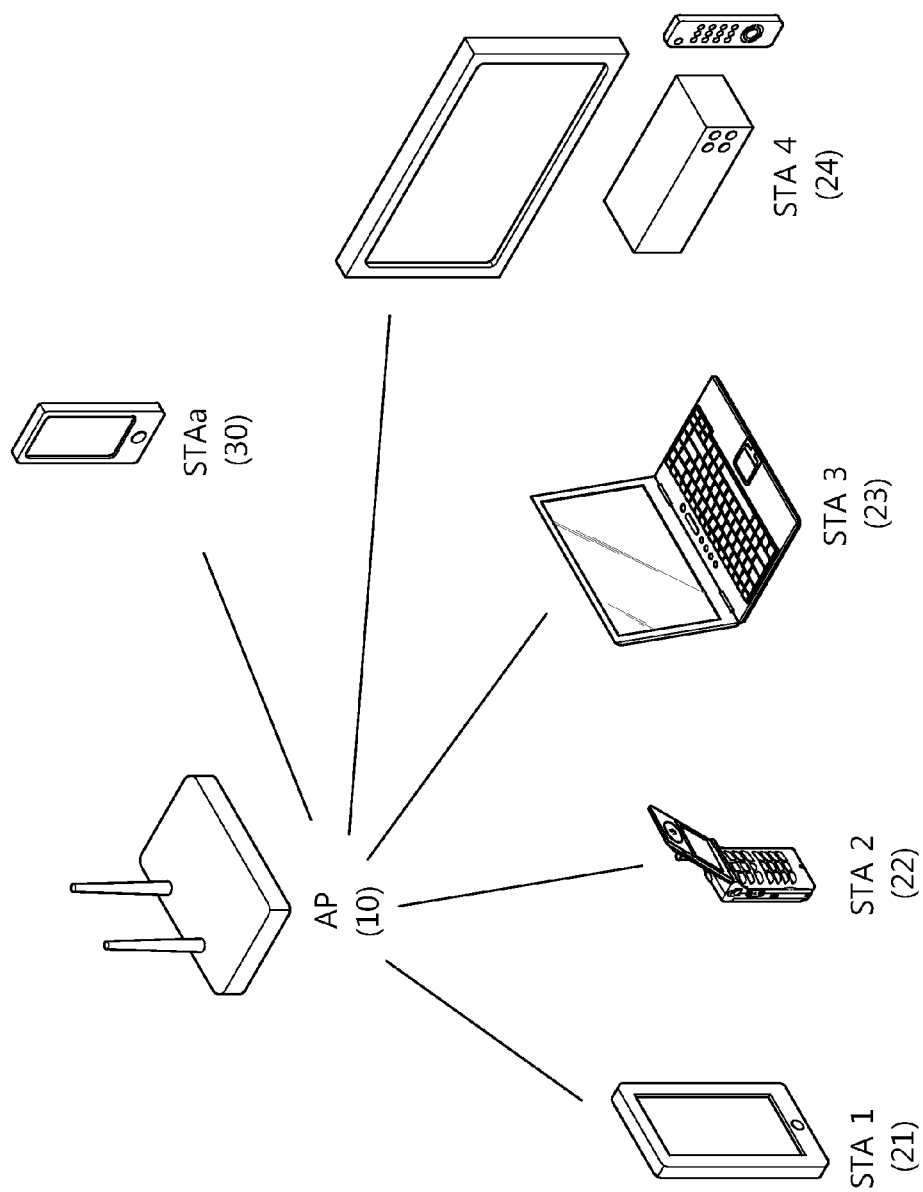
FIG. 1 is a view illustrating the configuration of a general Wireless Local Area Network (WLAN) system to which an embodiment of the present invention may apply.

FIG. 1 is a view illustrating the configuration of a general Wireless Local Area Network (WLAN) system to which an embodiment of the present invention may apply.

Referring to FIG. 1, the WLAN system includes one or more basic service sets (BSSs). A BSS is a set of stations (STAs) that may be successfully synchronized with each other and may communicate with each other, and is not a concept indicating a specific area.

An infrastructure BSS includes one or more non-Access Point (AP) stations (non-AP STA1 21, non-AP STA2 22, non-AP STA3 23, non-AP STA4 24, and non-AP STAa 30), an AP 10 providing a distribution service, and a distribution system (DS) linking multiple APs. In the infrastructure BSS, the AP manages the non-AP STAs of the BSS.

In contrast, an independent BSS (IBSS) is a BSS operating in an ad-hoc mode. The IBSS does not include an AP and thus lacks a centralized management entity. That is, in the IBSS, non-AP STAs are managed in a distributed manner. In the IBSS, all the STAs may be mobile STAs, and due to no permission to access the DS, constitute a self-contained network.

The STA is any functional entity that includes a medium access control (MAC) and a physical layer interface for a radio medium that follow the Institute of Electrical and Electronics Engineers (IEEE) 802.11 standards and in broader concept includes an AP and a non-AP station.

A non-AP STA is a STA that is not an AP, and may also be referred to as a mobile terminal, wireless device, wireless transmit/receive unit (WTRU), user equipment (UE), mobile station (MS), mobile subscriber unit or simply user. Hereinafter, for ease of description, the non-AP STA is denoted STA.

The AP is a functional entity that provides access to a DS via a radio medium for a STA associated with an AP. In an infrastructure BSS including an AP, communication between STAs is in principle achieved via an AP, but in case a direct link is set up, the STAs may perform direct communication between each other. The AP may also be referred to as a central controller, base station (BS), node-B, BTS (Base Transceiver System), site controller, or managing STA.

A plurality of BSSs including the BSS shown in FIG. 1 may be connected to each other via a distribution system (DS). The plurality of BSSs linked with each other through a DS is referred to as an extended service set (ESS). The APs and/or STAs included in the ESS may communicate with each other, and in the same ESS, STAs may travel from one BSS to another BSS while maintaining seamless communication.

In the WLAN system according to IEEE 802.11, the basic access mechanism of Medium Access Control (MAC) is a Carrier Sense Multiple Access with Collision Avoidance (CSMA/CS) mechanism. The CSMA/CS mechanism is also referred to as Distributed Coordination Function (DCF) of IEEE 802.11 MAC, and basically, it adopts a "listen before talk" access mechanism. Following such type of access mechanism, an AP and/or STA senses a radio channel or medium prior to transmission. If as a result of the sensing, the medium is determined to be in idle state, frame transmission is initiated through the medium. On the contrary, if the medium is sensed to be in occupied state, the AP and/or STA sets a deferred time for medium access and waits without starting its own transmission.

The CSMA/CS mechanism includes virtual carrier sensing in addition to physical carrier sensing in which an AP and/or STA directly senses a medium. The virtual carrier sensing is to make up for a problem that may occur in connection with medium access, such as hidden node problem. In order for virtual carrier sensing, the MAC of the WLAN system makes use of a network allocation vector (NAV). The NAV is a value by which an AP and/or STA currently using a medium or having authority to use the medium informs other AP and/or STA of a time remaining until the medium turns available. Accordingly, the value set by the NAV corresponds to a period during which the use of the medium is scheduled by the AP and/or STA transmitting a frame.

The IEEE 802.11 MAC protocol, together with a DCF, offers a Hybrid Coordination Function (HCF) that is based on a Point Coordination Function (PCF) that periodically performs polling so that all receiving APs and/or STAs may receive data packets in polling-based synchronized access scheme with the DCF. The HCF has an Enhanced Distributed Channel Access (EDCA) that has a contention-based access scheme for providing data packets to multiple users and HCCA (HCF Controlled Channel Access) that uses contention free-based channel access scheme using a polling mechanism. The HCF includes a medium access mechanism for enhancing Quality of Service (QoS) of WLAN and may transmit QoS data in both a contention period (CP) and contention free period (CFP).

In the wireless communication system, a STA cannot be immediately aware of the existence of a network due to the characteristics of the radio medium when a STA powers on and starts operating. Accordingly, in order to access a network, a STA, whatever type it is, should go through a network discovery process. When discovering a network through the network discovery process, the STA selects a network to subscribe to through a network selection process. Thereafter, the STA subscribes to the selected network and performs data exchange at a transmission end/reception end.

In the WLAN system, the network discovery process is implemented as a scanning procedure. The scanning procedure is separated into passive scanning and active scanning. The passive scanning is achieved based on a beacon frame that is periodically broadcast by an AP. In general, an AP in the WLAN system broadcasts a beacon frame at a specific interval (for example, 100 msec). The beacon frame includes information on a BSS managed by it. The STA passively awaits reception of the beacon frame at a specific channel. When obtaining the information on the network by receiving the beacon frame, the STA terminates the scanning procedure at the specific channel. The STA need not transmit a separate frame in achieving passive scanning, and the passive scanning is rather done once the beacon frame is received. Accordingly, the passive scanning may reduce the overall overhead. However, it suffers from a scanning time that is increased in proportion to the transmission period of the beacon frame.

The active scanning is that the STA actively broadcasts a probe request frame at a specific channel to request that all the APs to receive the probe request frame send network information to the STA. When receiving the probe request frame, an AP waits for a random time so as to prevent frame collision, and then includes network information in a probe response frame, then transmits the probe response frame to the STA. The STA receives the probe response frame to thereby obtain the network information, and the scanning procedure is then ended. The active scanning may get scanning done relatively quickly, but may increase the overall network overhead due to the need of a frame sequence that comes from request-response.

When finishing the scanning procedure, the STA selects a network per a specific standard on itself and then performs an authentication procedure alongside the AP. The authentication procedure is achieved in 2-way handshake. When completing the authentication procedure, the STA proceeds with an association procedure together with the AP.

The association procedure is performed in two-way handshake. First, the STA sends an association request frame to the AP. The association request frame includes information on the STA's capabilities. Based on the information, the AP determines whether to allow association with the STA. When determining whether to allow association, the AP transmits an association response frame to the STA. The association response frame includes information indicating whether to allow association and information indicating the reason for association being allowed or failing. The association response frame further includes information on capabilities supportable by the AP. In case association is successfully done, normal frame exchange is done between the AP and STA. In case association fails, the association procedure is retried based on the information on the reason for the failure included in the association response frame or the STA may send a request for association to other AP.

In order to overcome limit to speed that is considered to be a weakness in WLAN, IEEE 802.11n has been established relatively in recent years. IEEE 802.11n aims to increase network speed and reliability while expanding wireless network coverage. More specifically, IEEE 802.11n supports high throughput (HT) that reaches data processing speed up to 540 Mbps and is based on MIMO (Multiple Inputs and Multiple Outputs) technology that adopts multiple antennas at both transmission end and reception end in order to optimize data speed and minimize transmission errors.

As WLAN spreads and more diversified applications using WLAN show up, a need for a new WLAN system arises for supporting a higher throughput than the data processing speed supported by IEEE 802.11n. The WLAN system supporting very high throughput (VHT) is a subsequent version of the IEEE 802.11n WLAN system, which is a new one recently suggested to support a throughput more than 500 Mbps for a single user and data processing speed more than 1 Gpbs for multiple users in an MAC service access point (SAP).

Advancing further than the existing WLAN system supporting 20 MHz or 40 MHz, the VHT WLAN system intends to support 80 MHz, contiguous 160 MHz, non-contiguous 160 MHz band transmission and/or more bandwidth transmission. Further, the VHT WLAN system supports 250 Quadrature Amplitude Modulation (QAM) that is more than a maximum of 64QAM of the existing WLAN system.

Since the VHT WLAN system supports a Multi User-Multiple Input Multiple Output (MU-MIMO) transmission method for higher throughput, the AP may transmit a data frame simultaneously to at least one or more MIMO-paired STAs. The number of paired STAs may be maximally 4, and when the maximum number of spatial streams is eight, each STA may be assigned up to four spatial streams.

Referring back to FIG. 1, in the WLAN system shown in the figure, the AP 10 may simultaneously transmit data to a STA group including at least one or more STAs among a plurality of STAs 21, 22, 23, 24, and 30 associated with the AP 10. In FIG. 1, by way of example, the AP conducts MU-MIMO transmission to the STAs. However, in a WLAN system supporting Tunneled Direct Link Setup (TDLS) or Direct Link Setup (DLS) or mesh network, a STA to transmit data may send a Physical Layer Convergence Procedure (PLCP) Protocol Data Unit (PPDU) to a plurality of STAs using an MU-MIMO transmission scheme. Hereinafter, an example where an AP transmits a PPDU to a plurality of STAs according to an MU-MIMO transmission scheme is described.

Data may be transmitted through different spatial streams to each STA. The data packet transmitted by the AP 10 may be referred to as a PPDU, which is generated at the physical layer of the WLAN system and transmitted, or a frame as a data field included in the PPDU. That is, the PPDU for Single User-Multiple Input Multiple Output (SU-MIMO) and/or MU-MIMO or data field included in the PPDU may be called a MIMO packet. Among them, the PPDU for MUs may be called an MU packet. In the example of the present invention, assume that a transmission target STA group MU-MIMO-paired with the AP 10 includes STA1 21, STA2 22, STA3 23, and STA4 24. At this time, no spatial stream is assigned to a specific STA in the transmission target STA group, so that no data may be transmitted to the specific STA. Meanwhile, assume that STAa 30 is associated with the AP but is not included in the transmission target STA group.

In the WLAN system, an identifier may be assigned to the transmission target STA group in order to support MU-MIMO transmission, and this identifier is denoted group ID. The AP sends a group ID management frame including group definition information for allocating group IDs to the STAs supporting MU-MIMO transmission and accordingly the group IDs are assigned to the STAs before PPDU transmission. One STA may be assigned a plurality of group IDs.

Table 1 below represents information elements included in the group ID management frame.

TABLE 1

| Order | Information |
|---|---|
| 1 | Category |
| 2 | VHT action |
| 3 | Membership status |
| 4 | Spatial stream position |

The category field and VHT action field are configured so that the frame corresponds to a management frame and to be able to identify being a group ID management frame used in a next-generation WLAN system supporting MU-MIMO.

As in Table 1, the group definition information includes membership status information indicating whether to belong to a specific group ID, and in case of belonging to the group ID, information indicating the number of position to which the spatial stream set of the STA corresponds in all the spatial streams according to MU-MIMO transmission.

Since one AP manages a plurality of group IDs, the membership status information provided to one STA needs to indicate whether the STA belongs to each of the group IDs managed by the AP. Accordingly, the membership status information may be provided in the form of an array of subfields indicating whether it belongs to each group ID. The spatial stream position information indicates the position of each group ID, and thus, may be provided in the form of an array of subfields indicating the position of a spatial stream set occupied by the STA with respect to each group ID. Further, the membership status information and spatial stream position information for one group ID may be implemented in one subfield.

The AP, in case of sending a PPDU to a plurality of STAs through an MU-MIMO transmission scheme, transmits the PPDU, with information indicating a group identifier (group ID) in the PPDU as control information. When receiving the PPDU, a STA verifies whether it is a member STA of the transmission target STA group by checking the group ID field. If the STA is a member of the transmission target STA group, the STA may identify what number of position where the spatial stream set transmitted to the STA is located in the entire spatial stream. The PPDU includes information on the number of spatial streams allocated to the receiving STA, and thus, the STA may receive data by discovering the spatial streams assigned thereto.

Meanwhile, TV WS (White Space) draws attention as a newly available frequency band in the WLAN system. TV WS refers to an unused frequency band that is left as the analog TV broadcast is digitalized in the U.S. For example, TV WS includes a 54 to 598 MHz band. However, this is merely an example, and TV WS may be a permitted band that may be first used by a licensed user. The licensed user means a user that is permitted for use of a permitted band, and may also be referred to as a licensed device, primary user, or incumbent user.

The AP and/or STA operating in the TV WS should offer a protection function as to a licensed user, and this is because a licensed user has priority as to use of a TV WS band. For instance, in case a licensed user such as a microphone is already using a specific WS channel that is a frequency band split per protocol to have a certain bandwidth in the TV WS band, the AP and/or STA cannot use the frequency band corresponding to the WS channel in order to protect the licensed user. Further, the AP and/or STA should stop use of the frequency band if the licensed user happens to use the frequency band that is being used for transmission and/or reception of a current frame.

Accordingly, the AP and/or STA should first grasp whether a specific frequency band in the TV WS band is available, in other words, whether there is a licensed user in the frequency band. Grasping whether there is a licensed user in the specific frequency band is denoted spectrum sensing. As a spectrum sensing mechanism, an energy detection scheme or signature detection scheme may be utilized. If the strength of a received signal is higher than a predetermined value, it is determined that it is being used by a licensed user, or if a DTV preamble is detected, it may be determined to be being used by a licensed user.

Figure 2:
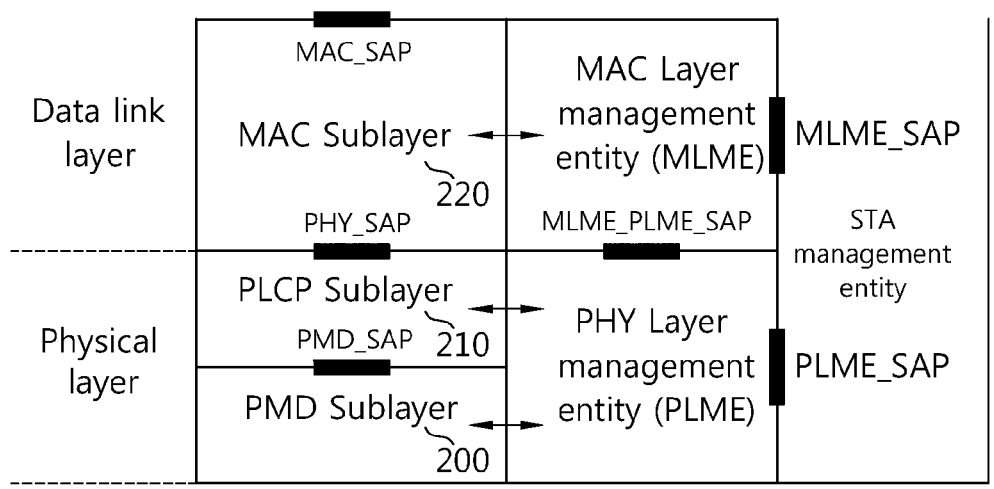
FIG. 2 is a diagram illustrating physical layer architecture of a wireless LAN system supported by IEEE 802.11.

FIG. 2 is a diagram illustrating physical layer architecture of a wireless LAN system supported by IEEE 802.11.

The PHY architecture of IEEE 802.11 includes a PLME (PHY Entity Management Entity), a PLCP (Physical Entity Convergence Procedure) sub-layer 210, and a PMD (Physical Medium Dependent) sub-layer 200. The PLME cooperates with the MLME (MAC Layer Management Entity) to provide a management function of the physical layer. The PLCP sub-layer 210 transfers an MPDU (MAC Protocol Data Unit) received from the MAC sub-layer 220 or transfers a frame provided from the PMD sub-layer 200 to the MAC sub-layer 220 according to instruction of an MAC layer between the MAC sub-layer 220 and the PMD sub-layer 200. The PMD sub-entity 200 is a PLCP lower entity to enable transmission/reception of a physical layer entity between two stations through a wireless medium is possible. The MPDU transferred from the MAC sub-layer 220 is called a PSDU (Physical Service Data Unit) at the PLCP sub-layer 210. Although the MPDU is similar to the PSDU, A-MPDU (aggregated MPDU) obtained by aggregating a plurality of MPDUs is transferred, each MPDU may be different from each PSDU.

The PLCP sub-layer 210 adds an additional field including necessary by a physical layer transceiver during a procedure of receiving the PSDU from the MAC sub-layer 220 and transferring the PSDU to the PMD sub-layer 200. In this case, the additional field may include tail bits necessary to return a PLCP preamble, a PLCP header, and a convolution encoder to a zero state. The PLCP sub-layer 210 receives a TXVECTOR parameter including control information necessary to generate and transmit the PPDU and control information necessary when a reception STA receives and interprets the PPDU from a MAC sub-layer. The PLCP sub-layer 210 uses information included in a TXVECTOR parameter when generating a PPDU including a PSDU.

The PLCP preamble enables a receiver to prepare a synchronizing function and antenna diversity before transmitting the PSDU. The data field may include padding bits, a service field including a bit sequence for initializing a scrambler, and a coded sequence to which a bit sequence is encoded as well as the PSDU. In this case, tail bits are attached to the bit sequence. In this case, an encoding scheme may be selected as one of BCC (Binary Convolutional Coding) encoding or LDPC (Low Density Parity Check) encoding according to an encoding scheme supported from an STA receiving the PPDU. The PLCP header includes a field having information on a PPDU (PLCP Protocol Data Unit) to be transmitted. This will be described in detail with reference to FIGS. 3 to 5 later.

In the PLCP sub-layer 210, a PPDU (PLCP Protocol Data Unit) is generated by adding the above filed to the PSDU and the generated PPDU is transmitted to a reception station through the PMD sub-layer. The reception station receives the PPDU to obtain and restore information necessary to restore data from a PLCP preamble and a PLCP header. A PLCP sub-layer of the reception station transfers an RXVECTOR parameter including PLCP preamble and control information included in a PLCP header to an MAC sub-layer so that a PPDU may be interpreted and data may be acquired in a reception state.

Figure 3:
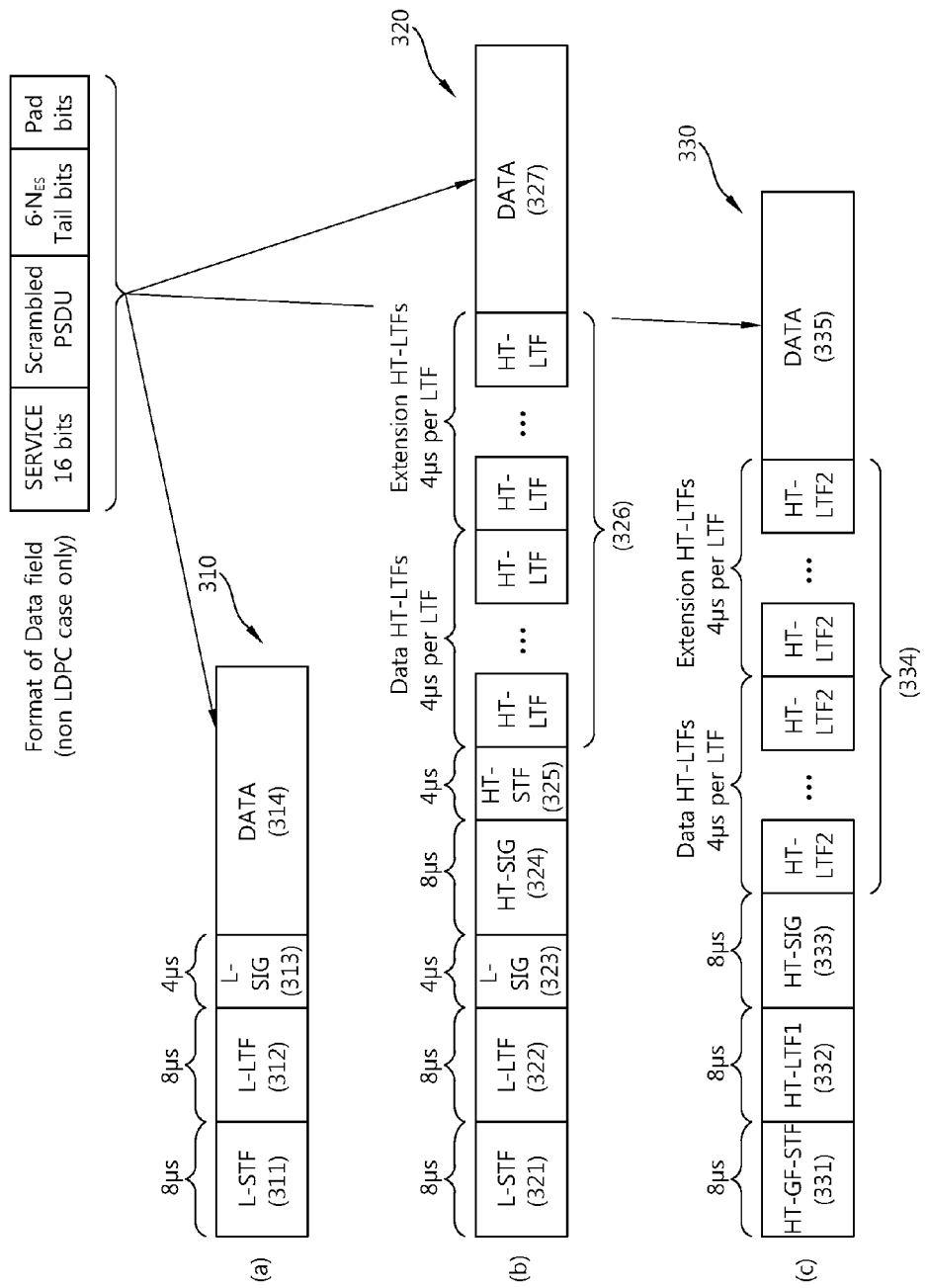
FIGS. 3 and 4 are block diagrams illustrating a PPDU format used in a wireless LAN system according to an embodiment of the present invention.
Figure 4:
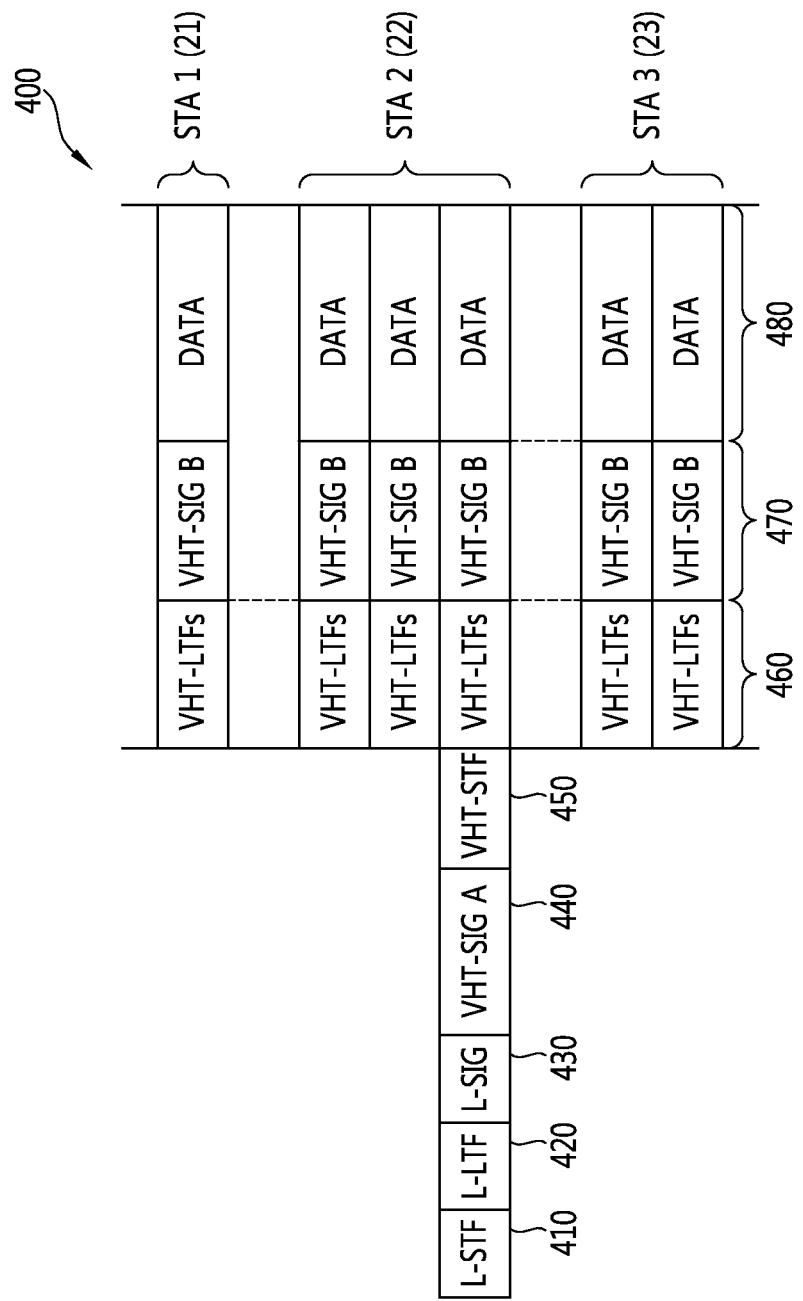

FIGS. 3 and 4 are block diagrams illustrating a PPDU format used in a wireless LAN system according to an embodiment of the present invention. Hereinafter, an STA operating in a legacy wireless LAN system based on IEEE 802.11a/b/g which is a conventional wireless LAN standard before IEEE 802.11n refers to "Legacy STA (L-STA)". Further, an STA capable of supporting an HT based on IEEE 802.11n by an HT wireless LAN system refers to an HT-STA.

A subfigure (a) of FIG. 3 illustrates a Legacy PPDU (L-PPDU) which is a PPDU used in IEEE 802.11a/b/g being an existing wireless LAN system standard before IEEE 802.11n. Accordingly, in the HT wireless LAN system to which the IEEE 802.11n standard is applied, the legacy STA (L-STA) may transmit and receive an L-PPDU having the above format.

Referring to subfigure (a), the L-PPDU 310 includes an L-STF 311, an L-LTF 312, an L-SIG field 313, and a data field 314.

The L-STF 311 is used for frame timing acquisition, AGC (Automatic Gain Control) convergence, coarse frequency acquisition, and the like.

The L-LTF 312 is used for frequency offset and channel estimation.

The L-SIG field 313 includes control information to demodulate and decode the data field 314.

The L-PPDU may be transmitted in the order of the L-STF 311, the L-LTF 312, the L-SIG field 313, and the data field 314.

A subfigure (b) of FIG. 3 is a block diagram illustrating an HT-mixed PPDU format so that the L-STA and the HT-STA may coexist. Referring to FIG. 3(b), the HT-mixed PPDU 320 includes an L-STF 321, an L-LTF 322, an L-SIG 323, an HT-SIG 324, an HT-STF 325, a plurality of HT-LTFs 326, and a data field 327.

The L-STF 321, the L-LTF 322, and the L-SIG field 323 have the same functions as those of reference numerals 311, 312, and 313 of FIG. 3(a), respectively. Accordingly, even if the L-STA receives the HT-mixed PPDU 320, the L-STA may interpret a data field through the L-LTF 322, the L-LTF 322, and the L-SIG 323. However, the L-LTF field 323 may further include information to estimate a channel to be performed when the HT-STA receives the HT-mixed PPDU 320 and interprets an L-SIG field 323, an HT-SIG 324, and an HT-STF 325.

The HT-STA may recognize that the HT-mixed PPDU 320 is a PPDU through an HT-SIG 324 after the L-SIG 323, and may demodulate and decode the data field 327 based on this.

The HT-STF 325 may be used for frame timing synchronization for the HT-STA and AGC convergence, and the like.

The HT-LTF 326 may be used to estimate the channel for demodulating the data field 327. Since the IEEE 802.11n supports an SU-MIMO, a plurality of HT-LTFs 326 may be configured to estimate the channel with respect to each data field transmitted to a plurality of space streams.

The HT-LTF 326 may include a Data HT-LTF used to estimate a channel with respect to a space stream and an extension HT-LTF additionally used for full channel sounding. Accordingly, a plurality of HT-LTFs 326 may be equal to or greater than the number of a transmitted space stream.

The HT-mixed PPDU 320 firstly transmits the L-STF 321, the L-LTF 322, and the L-SIG field 323 to receive L-STA and to acquire data. Next, the HT-SIG field 324 is transmitted for demodulation and decoding of the data to be transmitted for the HT-STA.

The L-STA and the HT-STA may receive a corresponding PPDU to acquire data by transmitting the HT-SIG field 324 without performing beam-forming. Next, the HT-STF 325, the HT-LTF 326, and the data field 327 are transmitted in a wireless scheme through pre-coding.

The STA receiving the signal through pre-coding transmits an HT-STF 325 to consider a part in which power by pre-coding is changed and then transmits a plurality of HT-LTFs 326 and the data field 327. In the HT wireless LAN system, although an HT-STA uses 52 data sub-carriers per OFDM symbol, an L-STA using the same 20 MHz also uses 48 data sub-carriers per OFDM symbol. In order to support backward compatibility with an existing system, since the HT-SIG 324 is decoded in the HT-mixed PPDU 320 format using an L-LTF 322, the HT-SIG field 324 includes (48×2) data sub-carriers. Next, an HT-STF 325 and an HT-LTF 426 include 52 data sub-carriers per OFDM symbol. As a result, since the HT-SIG field 324 is supported with 1/2, BPSK (Binary Phase Shift Keying), each HT-SIG field 324 includes 24 bits so that each HT-SIG field 324 is transmitted with a total of 48 bits. That is, channel estimation for an L-SIG field 323 and an HT-SIG field 324 uses the L-LTF 322, and a bit string constituting the L-LTF 322 is expressed by a following equation 1. The L-LTF 322 includes 48 data sub-carriers except for a DC sub-carrier per one symbol.

$$L_{-26,26} = \{1, 1, -1, -1, 1, 1, -1, 1, -1, 1, 1, 1, 1, 1,\\ 1, -1, -1, 1, 1, -1, 1, -1, 1, 1, 1, 1, 0, 1, -1,\\ -1, 1, 1, -1, 1, -1, 1, -1, -1, -1, -1, -1, 1, 1,\\ -1, -1, 1, -1, 1, -1, 1, 1, 1, 1\}$$ [Equation 1]

A subfigure (c) of FIG. 3 is a block diagram illustrating an HT-Greenfield PPDU 330 usable by only the HT-STA. Referring to the subfigure (c), the HT-GF PPDU 330 includes an HT-GF-STF 331, an HT-LTF1 332, an HT-SIG 333, a plurality of HT-LTF2 334, and a data field 335.

The HT-GF-STF 331 is used for frame timing acquisition and AGC.

The HT-LTF1 332 is used to estimate a channel.

The HT-SIG 333 is used to demodulate and decode the data field 335.

The HT-LTF2 334 is used to estimate a channel for demodulating the data field 335. In the same manner, since the HT-STA uses the SU-MIMO, channel estimation with respect to each data field transmitted to a plurality of space streams is required so that a plurality of HT-LTFs 326 may be configured.

A plurality of HT-LTF2 334 may include a plurality of Data HT-LTFs and a plurality of extension HT-LTFs as in an HT-LTF 326 of the HT-mixed PPDU 320.

As shown in FIGS. 3(a), (b), and (c), each of data fields 314, 327, and 335 may include a service field, a scrambled PSDU, a tail bit, and a padding bit. The service field may be used to initialize the scrambler. The service field may be set to 16 bits. In this case, a bit to initialize the scrambler may be implemented with 7 bits. The tail field may include a bit sequence necessary to return a convolution encoder to a state 0. A bit size in proportion to the number of BCC (Binary Convolutional Code) encoders used to encode data to be transmitted may be assigned to the tail field. In detail, it may be implemented to have 6 bits per the number of BCCs.

FIG. 4 is a diagram illustrating an example of a PPDU format used for a wireless LAN system to support a VHT.

Referring to FIG. 4, a PPDU 400 may include an L-STF 410, an L-LTF 420, an L-SIG field 430, a VHT-SIGA field 440, a VHT-STF 450, a VHT-LTF 460, a VHT-SIGB field 470, and a data field 480.

A PLCP sub-layer constituting a PHY is converted into a data field 480 by adding necessary information to a PSDU received from an MAC layer, and adds fields such as the L-STF 410, the L-LTF 420, the L-SIG field 430, the VHT-SIGA field 440, the VHT-STF 450, the VHT-LTF 460, and the VHT-SIGB 470 to generate a PPDU 400, and transmits the PPDU 400 to one or more STAs through a PMD sub-layer. The PLCP sub-layer adds control information necessary to generate the PPDU to the PPDU to transmit the PPDU so that control information used to interpret the PPDU by the reception STA is provided from a TXVECTOR parameter received from a MAC layer.

The L-STF 410 is used for frame timing acquisition, AGC (Automatic Gain Control) convergence, and coarse frequency acquisition.

The L-LTF 420 is used to estimate a channel for demodulating the L-SIG field 430 and the VHT-SIGA field 440.

The L-SIG field 430 is used when the L-STA receives and interprets the PPDU 400 to acquire data. The L-SIG field 430 includes a rate sub-field, a length sub-field, a parity bit, and a tail field. The rate sub-field is set to a value indicating a bit rate with respect to data to be currently transmitted.

The length sub-field is set to a value instructing an octet length of a PSDU requesting to transmit to a PHY layer from an MAC layer. In this case, an L_LENGTH parameter being a parameter associated with information of an octet length of the PSDU is determined based on a TXTIME parameter being a parameter associated with a transmission time. The TXTIME represents a transmission time when a PHY layer determines for PPDU transmission including a PSDU corresponding to a transmission time requested from the MAC layer for transmission of a PSDU (physical service data unit). Accordingly, since an L_LENGTH parameter is a parameter associated with a time, a length sub-field included in the L-SIG field 430 includes information on the transmission time.

The VHT-SIGA field 440 includes control signal or signal information necessary when STAs receiving the PPDU interprets the PPDU 400. The VHT-SIGA field 440 is transmitted with two OFDM symbols. Accordingly, the VHT-SIGA field 440 may be divided into a VHT-SIGA1 field and a VHT-SIGA2 field. The VHT-SIGA1 field includes channel bandwidth information for PPDU transmission, identification information on presence of use of STBC (Space Time Block Coding), information of SU or MU-MIMO instructing a transmitting scheme of a PPDU, information instructing an AP and a transmission target STA group being a plurality of MU-MIMO paired STAs when the transmitting method is MU-MIMO, and information on a space stream assigned to each STA included in the transmission target STA group. The VHT-SIGA2 field includes Short Guard Interval (SGI) relation information.

Information instructing an MIMO transmitting scheme and information instructing the transmission target STA group may be implemented by one MIMO instruction information. For example, the information may be implemented by a group ID. The group ID may be set to a value having a specific range. A specific value of the range indicates an SU-MIMO transmitting scheme. When the PPDU 400 is transmitted in the MU-MIMO transmitting scheme, remaining values may be used as an identification with respect to a corresponding transmission target STA group.

If the group ID indicates that a corresponding PPDU 400 is transmitted in an SU-MIMO transmitting scheme, the VHT-SIGA2 field includes coding instruction information instructing whether a coding scheme applied to a data field is BCC (Binary Convolution Coding) or LDPC (Low Density Parity Check) coding, and MCS (modulation coding scheme) information with respect to a channel between a transmitter and a receiver. Further, the VHT-SIGA2 field may include an AID of a transmission target STA of a PPDU and/or a partial AID including a partial bit sequence of the AID.

If the group ID indicates that a corresponding PPDU 400 is transmitted in an MU-MIMO scheme, the VHT-SIGA field 440 includes coding instruction information indicating whether a coding scheme applied to a data field for transmission to MU-MIMO paired reception STAs is BCC or LDPC coding. In this case, MCS (modulation coding scheme) information with respect to each reception STA may be included in a VHT-SIGB field 470.

The VHT-STF 450 is used to improve performance of AGC estimation in MIMO transmission.

The VHT-LTF 460 is used when the STA estimates an MIMO channel. A next generation wireless LAN system supports the MU-MIMO, the VHT-LTF 460 may be set corresponding to the number of space streams transmitted from the PPDU 400. In addition, full channel sounding is supported. When the full channel sounding is supported, the number of VHT LTFs may be increased.

The VHT-SIGB field 470 includes dedicated control information necessary when a plurality of MIMO paired STAs receive the PPDU 400 to acquire data. Accordingly, only when control information included in the VHT-SIGA field 440 indicates that a currently received PPDU 400 is MU-MIMO transmitted, the STA may be designed to decode the VHT-SIGB field 470. In contrast, when control information included in the VHT-SIGA field 440 indicates that a currently received PPDU 400 is for a single STA, the STA may be designed not to decode the VHT-SIGB field 470.

The VHT-SIGB field 470 may include information on MCS (modulation and coding scheme) with respect to respective STAs and information on rate-matching. The VHT-SIGB field 470 may include information indicating a PSDU length included in a data field for each STA. The information indicating a length of the PSDU is information indicating a length of a bit sequence of the PSDU and may be indicated as an octet unit. Meanwhile, when the PPDU is SU transmitted, information on an MCS is included by a VHT-SIGA field 440, but may not be included in the VHT-SIGB field 470. A size of the VHT-SIGB field 470 may be changed according to a type (MU-MIMO or SU-MIMO) of MIMO transmission and a channel bandwidth used for PPDU transmission.

The data field 480 includes data in which transmission to an STA is intended. The data field 480 includes a PSDU (PLCP Service Data Unit) to which a MPDU (MAC Protocol Data Unit) at an MAC layer is transferred, a service field to initialize a scrambler, a tail field including a bit sequence necessary to return a convolution encoder to a zero state, and padding bits to regulate a length of a data field. In a case of MU transmission, transmission intended data unit may be included in a data field 480 transmitted to each STA, and the data unit may be A-MPDU (aggregate MPDU).

Fields included in each PPDU format shown in FIGS. 3 and 4 may be transmitted as an OFDM symbol through processing of a physical layer. Particularly, a data sequence constituting the data field may be transmitted as at least one data OFDM symbol according to a size thereof. Further, due to a wireless channel state, time synchronization mismatch between a transmitter and a receiver, and interference between symbols, normal generation, transmission, reception, and interpretation of a data OFDM symbol may be interfered. In order to prevent this, a Guard Interval (GI) is applied to a data OFDM symbol so that an abnormal operation may be prevented so that transmission/reception of data having high reliability may be ensured. Further, in an HT wireless LAN system and a VHT wireless LAN system, an SGI is applied so that a consumption time due to a guard interval may be reduced to ensure more efficient transmission/reception. In the HT wireless LAN system and the VHT wireless LAN system, presence of application of an SGI may be instructed in the signal field and the VHT-SIG A.

As shown in FIG. 1, in a wireless LAN system, when the AP 10 transmits data to an STA1 21, an STA2 22, and an STA3 23, the AP 10 may transmit a PPDU to an STA group with the STA1 21, the STA2 22, the STA3 23, and the STA4 24. In this case, as shown in FIG. 4, a space stream may not be assigned to an STA4 24, a specific number of space streams are assigned to the STA1 21, the STA2 22, and the STA3 23 so that the data may be transmitted. In an example of FIG. 4, one space stream may be assigned to an STA1 21, three space streams may be assigned to an STA2 22, and two space streams may be assigned to an STA3 23.

Meanwhile, in recent years, as various communication services such as smart grid), e-Health, and Ubiquitous are introduced, a M2M (Machine to Machine) technology to support this has been spotlighted. A sensor to detect a temperature and humidity, home appliance such as a camera and a TV, a process machine at a factory, and large machines such as a car may be one element to configure an M2M system. Elements to configure an M2M system may transmit and receive data based on WLAN communication. When devices configuring the M2M system support a WLAN and configure a network and refers to an M2M wireless LAN system.

A characteristic of a wireless LAND system supporting M2M is as follows.

1) a large number of STAs: It is assumed that a large number of STAs are located in a BSS unlike an existing network. A private device and sensors installed at a house or an office are considered. Accordingly, a considerably large number of STAs may be connected to one AP.

Low traffic load per STA: Since an M2M terminal has a traffic pattern to collect and report peripheral information, it is not necessary to often send the traffic load and an amount of information is small.

3) Communication based on uplink: an M2M receives a command with downlink to do action and reports result data to uplink. Since main data is generally transmitted to uplink, uplink becomes a center in a system supporting an M2M.

4) Power management of STA: An M2M terminal is generally operated as a battery and it is difficult for a user to often charge the M2M terminal. Accordingly, a power management method to minimize battery consumption is required.

5) Automatic recovery function: a person has a difficulty in directly operating a device configuring an M2M system at a specific situation, an automatic recovery function is required.

A next generation wireless LAN system standard using the M2M communication as a used example is discussed. A prominent characteristic of the wireless LAN system may have service coverage greater than a diameter of 1 km at an unlicensed band less than a 1 GHz band except for a TV WS band. This means that the wireless LAN system has significantly wide service coverage as compared with a wireless LAN based on an existing indoor. That is, unlike existing 2.4 GHz and 5 GHz, a wireless LAN is operated at a band less than 1 GHz represented as 700~900 MHz, due to a propagation characteristic of a corresponding band, a service coverage of the same transmission power contrast may be extended to about 2 to 3 times. In this case, a significant large number of STAs may be connected per one AP. A used example considered in the next generation wireless LAN may be as follows.

Used Example 1

Sensors and Meters

1a: smart grid—meter to pole
1c: Environmental/Agricultural Monitoring
1d: Industrial process sensors
1e: Healthcare
1f: Healthcare
1g: Home/Building Automation
1h: Home sensors Used Example 2

Backhaul Sensor and Meter Data

Backhaul aggregation of sensors
Backhaul aggregation of industrial sensors

Used Example 3

Extended Range Wi-Fi

Outdoor extended range hotspot)
Outdoor Wi-Fi for cellular traffic offloading

A case of a sensor and a meter being the used example 1 is a used example regarding the above M2M, and various types of sensor devices are connected to an AP of a wireless LAN system to perform M2M communication. Particularly, in a case of smart grid, maximum 600 sensor devices may be connected to one AP.

A case of a backhaul sensor and data meter being the used example 2 is a case where an AP providing wide coverage serves as a backhaul link of another communication system.

The used example 3 includes a case of being aimed to provide hot spot communication of outdoor extended range such as extended home service coverage, campus service coverage, and shopping mall and a case of being aimed to distribute overloaded cellular traffic because the AP offloads traffic of a cellular mobile communication.

The present invention suggests a format of a data unit for an apparatus operating at a band less than 1 GHz as discussed in a next generation wireless LAN standard. In detail, the present invention suggests a structure of an efficient physical layer preamble for an apparatus operating at a band less than 1 GHz. Hereinafter, a provided data unit, that is, the PPDU may be sequentially transmitted in the form of an OFDM symbol in an inclusion order of the field.

Communication at a band less than 1 GHz has a significantly wide service coverage as compared with a wireless LAN system based on an existing indoor due to a propagation characteristic. To this end, a physical entity (PHY) characteristic in an existing VHT wireless LAN system may be implemented in a 1/10 down-clocking form. In this case, a 20/40/80/160/80+80 MHz channel bandwidth in a VHT wireless LAN system is provided as a 2/4/8/16/8+8 MHz channel bandwidth at a band less than 1 GHz through 1/10 downclocking. Accordingly, a Guard Interval (GI) may be increased by 10 times from existing 0.8 us to 8 us. A following table 2 illustrates performance comparison between a physical layer of a VHT wireless LAND system and a physical layer of a wireless LAN system based on a band less than 1/10 down clocked 1 GHz.

TABLE 2

| VHT wireless LAN system PHY | | Wireless LAN system PHY based on band less than 1/10 downclocked 1 GHz | |
|---|---|---|---|
| Channel bandwidth | Processing rate | Channel bandwidth | Throughput |
| 20 MHz | 86.7 Mbps | 2 MHz | 8.67 Mbps |
| 40 MHz | 200 Mbps | 4 MHz | 20 Mbps |
| 80 MHz | 433.3 Mbps | 8 MHz | 43.33 Mbps |
| 160 MHz | 866.7 Mbps | 16 MHz | 86.67 Mbps |
| 80 + 80 MHz | 866.6 Mbps | 8 + 8 MHz | 86.66 Mbps |

Hereinafter, as an example, the following is one OFDM 1 symbol duration is 40 us on the assumption that a PHY characteristic of the VHT wireless LAN system is 1/10 downclocked for convenience of a description. A range of an embodiment of the present invention is not limited to a specific numeric range.

Since an existing previously considered legacy device is not located at a band of 1 GHz or less, it may be important to efficiently apply a PHY preamble to a maximum 1 GHz or less without considering back ward compatibility. When considering the above point, a PPDU format as shown in FIG. 5 is suggested.

Figure 5:
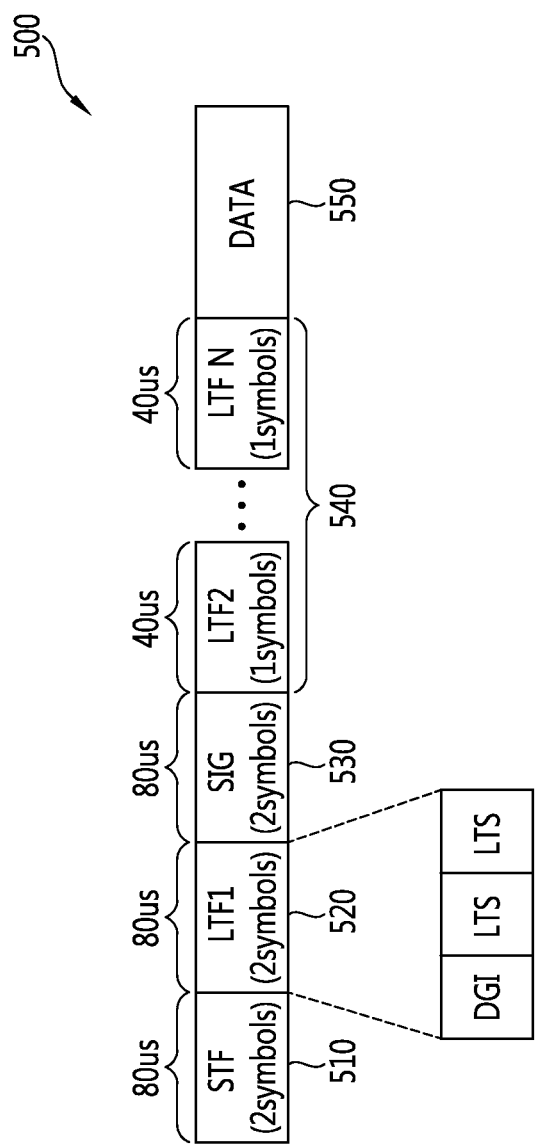
FIG. 5 is a block diagram illustrating an example of a PPDU format for transmission through a band of 1 GHz or less according to an embodiment of the present invention.

FIG. 5 is a block diagram illustrating an example of a PPDU format for transmission through a band of 1 GHz or less according to an embodiment of the present invention.

Referring to FIG. 5, a PPDU 500 has a structure obtain by 1/10 downclocking an HT-GF PPDU format as shown in the subfigure (c) of FIG. 3. The PPDU 500 includes an STF 510, an LTF1 520, an SIG field 530, at least one LTF2 540, and a data field 550.

The STF 510 is used for frame timing acquisition and AGC. The STF 510 includes 2 OFDM symbols, and has OFDM symbol duration of 80 us by summing two 40 us.

The LTF1 520 is used to estimate a channel. The LTF1 520 includes 2 OFDM symbols, and has OFDM symbol duration of 80 us by summing two 40 us. The LTF1 520 includes a DGI (Double Guard Interval) and two LTSs (Long Training Symbols).

The SIG field 530 is used to demodulate and decode the data field 540. The SIG field 530 includes 2 OFDM symbols, and has OFDM symbol duration of 80 us by summing two 40 us.

At least one LTF 540 is used to estimate a channel for demodulating the data field 550. Each LTF includes one OFDM symbol, and has OFDM symbol duration of 40 us.

As shown in FIG. 5, when a PPDU of a format is transmitted, it takes a total of 160 us to transmit the SIG field 530. A PPDU of the format may be used to transmit a channel bandwidth of 2 MHz or greater.

Figure 6:
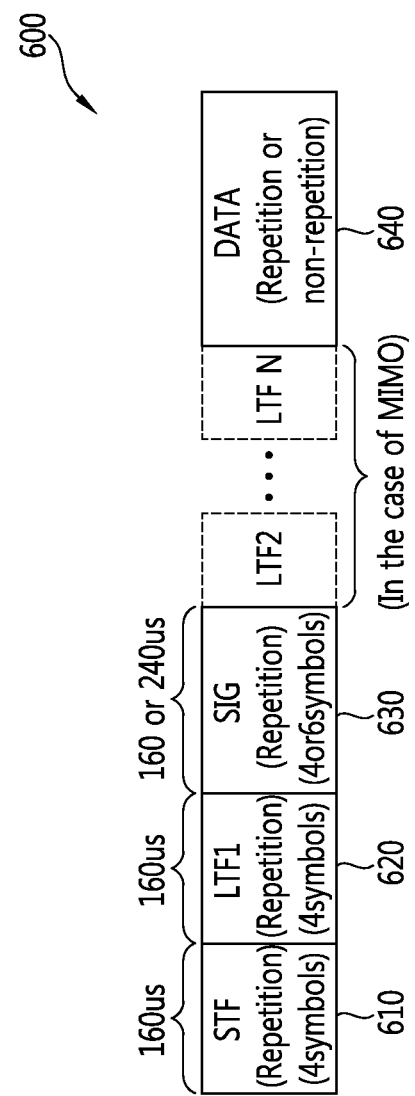
FIG. 6 is a block diagram illustrating an example of a PPDU formation for 1 MHz transmission at a band of 1 GHz of less according to an embodiment of the present invention.

Meanwhile, for communication of extended coverage, there has been suggested a PPDU format as shown in FIG. 6 where each STF, LTF, SIG, and/or data fields included in a PPDU of a format as shown in FIG. 5 are repeated on a time of twice of greater and a frequency axis.

FIG. 6 is a block diagram illustrating an example of a PPDU formation for 1 MHz transmission at a band of 1 GHz of less according to an embodiment of the present invention.

Referring to FIG. 6, the PPDU 600 may include an STF 610, an LTF1 620, an SIG field 630, and a data field 640. In addition, a PPDU for MIMO transmission may further include at least one LTF (LTF2 to LTF N) according to the number of used space streams.

Referring to STF 610 and LTF1 620, as compared with the STF 510 and the LTF1 520 of FIG. 5, an OFDM symbol is repeatedly formed. That is, respective OFDM symbol(s) composed of a bit sequence fundamentally constituting an STF and an LTF1 are repeated.

Figure 8:
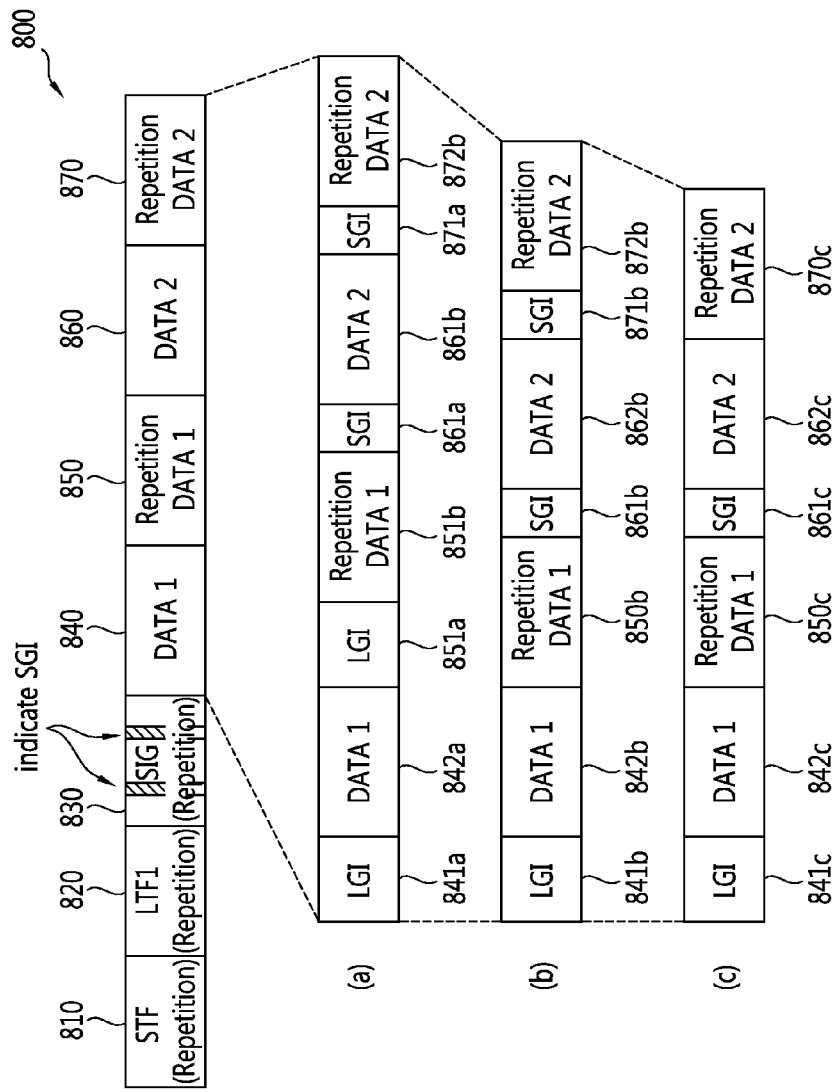
FIG. 8 is a block diagram illustrating another example of a PPDU format according to an embodiment of the present invention.

Accordingly, the STF 610 includes 4 OFDM symbols, and has OFDM symbol duration of 160 us by summing four 40 us. The LTF1 620 includes 4 OFDM symbols, and has OFDM symbol duration of 160 us by summing four 40 us. That is, when a PPDU as shown in FIG. 8 is provided, a time of twice elapses as compared with when a transmission time of a preamble part is 320 us and a PPDU of a format as shown in FIG. 6 is transmitted.

Further, an OFDM symbol may be repeatedly formed at an SIG field 630, and the SIG field 630 may be repeatedly formed at least twice.

Meanwhile, repetition of an OFDM symbol may be or may not be applied to a data field 640. Whether repletion of an OFDM symbol is applied to the data field 640 may be implemented in an SIG field 630 through a specific indication field. The specific indication field may be implemented by an MCS sub-field indicating MCS (Modulation and Coding Scheme) applied to the data field 640. When the MCS sub-field indicates that an MCS of the lowest level is applied to a data field, it may be implemented so that repletion of the OFDM symbol is applied to the data field 640.

As shown in FIG. 6, a PPDU format to which repletion of the OFDM symbol is applied may be used to transmit/receive a frame for wider service coverage by using a channel bandwidth of 1 MHz.

In an HT-GF PPDU based on a PPDU format as shown in FIG. 6, when the number of a space stream is 1, that is, when a use of an SGI is prohibited to single stream transmission to which an MIMO is not applied. This is because a data processing complexity side may make it difficult to apply an SGI from a first data filed symbol transmitted after the SIG field due to decoding delay of the SIG field although the SIG field indicates a use of the SGI.

However, it is expected in a wireless communication environment to which a next generation wireless LAN system as well as a sensor application are applied that a frequency of single user single stream transmission in most traffic may be very high. If the use of the SGI is prohibited at the data field symbol in the above environment, loss may occur in a processing rate side.

As shown in FIGS. 5 and 6, in a new PPDU format applying 1/10 down clock to a PPDU format provided by an existing wireless LAN system, a real time of a short GI is 4 us and is significantly longer than a typical indoor channel multipath delay. The real time of the short GI may ensure a sufficient time as GI with respect to an outdoor environment except for an environment having a significantly great multipath delay. Accordingly, in a case of single stream transmission, it is effective to applying the SGI to a data symbol.

Figure 7:
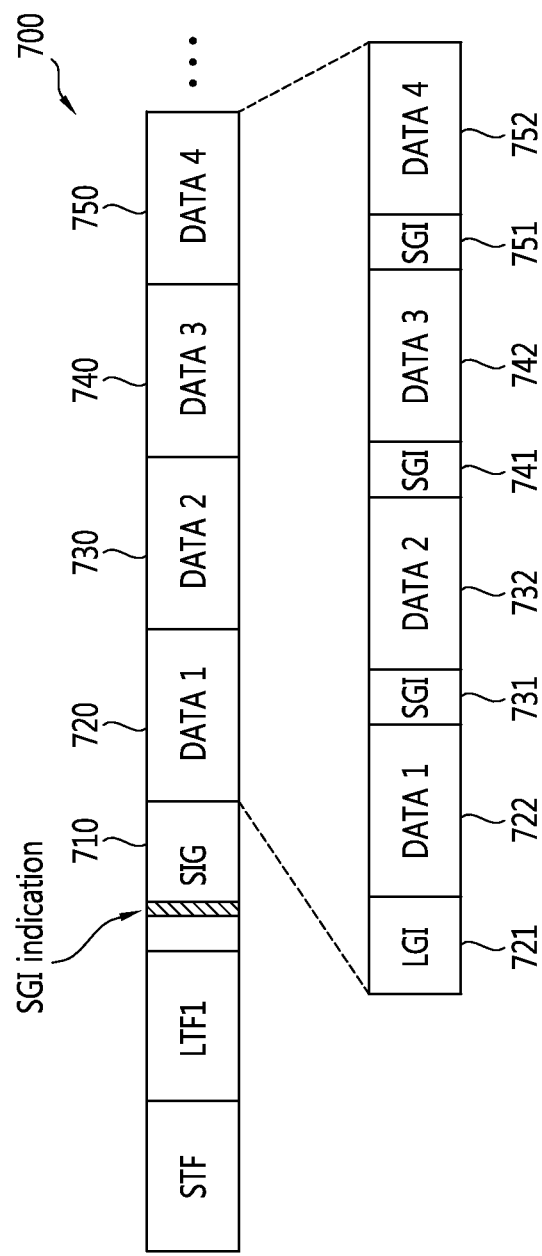
FIG. 7 is a block diagram illustrating another example of a PPDU format according to an embodiment of the present invention.

FIG. 7 is a block diagram illustrating another example of a PPDU format according to an embodiment of the present invention.

The PPDU 700 has a format of a PPDU used for single stream transmission using 2/4/8/16/8+8 MHz channel bandwidth in a next generation wireless LAN system.

Referring to FIG. 7, the PPDU includes an STF, an LTF1, a SIG field 710, a data field 1 720, a data field 2 730, a data field 3 740, and a data field 4 750. Although it is assumed that the number of data fields is fourth in the example, the number of data fields is illustrative purpose only. The number of the data fields may be one or more.

The SIG field 710 includes information indicating that an SGI may be used for the data field.

A GI is applied to each data field OFDM symbol. A long GI (LGI) 721 is applied to an OFDM symbol of the data field 1 720 and the OFDM symbol of the data field 1 720 includes data 1 722 (hereinafter, the LGI means a general GI as compared with the SGI). Each OFDM symbol of a data field 2 730, a data field 3 740, and a data field 4 750.

As shown in FIG. 7, when applying the SIG to the SIG field is indicated, an LGI is applied to a first data OFDM symbol after the SIG field, and a short SGI is applied to next data OFDM symbol.

FIG. 8 is a block diagram illustrating another example of a PPDU format according to an embodiment of the present invention.

The PPDU shown in FIG. 8 is a PPDU format used for single stream transmission through 1 MHz channel bandwidth in a next generation wireless LAN system.

Referring to FIG. 8, a PPDU 800 includes a repeated STF 810, a repeated LTF1 820, a repeated SIG field 830, and at least one data field. The shown PPDU is characterized that OFDM symbol repletion is applied. That is, the repeated STF 810, the repeated 820, the repeated SIG field 830 may be formed by OFDM symbol(s) composed of a bit sequence constituting original STF, LTF1, and SIG field as in the STF 610, the LTF1 620, and the SIG field 630 of FIG. 6. The STF and the LTF1 are configured by four OFDM symbols with two repeated OFDM symbols constituting original STF and LTF1. The repeated SIG field is formed by OFDM symbols constituting an original SIG field.

The PPDU 800 includes a repeated data field formed by repeating at least one data field and corresponding data field. The PPDU 800 includes a data field 1 840, a repeated data field 1 850, a data field 2 860, and a repeated data field 2 870.

Meanwhile, an LGI is applied to a data field 1 840 being a first data OFDM symbol transmitted after the repeated SIG field 810 and a repeated data field 1 850 being a second data OFDM symbol. An SGI is applied to next transmitted OFDM symbols, that is, a data field 2 860 and a repeated data field 2 870. The above PPDU format may refer to FIG. 8(a).

Referring to a subfigure (a) of FIG. 8, an LGI 841a is applied to an OFDM symbol of the data field 1 840, and the OFDM symbol of the data field 1 840 includes data 1 842a. Further, an LGI 851a is applied to an OFDM symbol of a data field 1 850 and the OFDM symbol of a data field 1 850 includes repeated data 1 852a.

An SGI 861a is applied to an OFDM symbol of the data field 2 860. An SGI 871a is applied to an OFDM symbol of a repeated data field 2 870, and the OFDM symbol of a repeated data field 2 870 includes repeated data 2 872a.

According to a PPDU format shown in the subfigure (a) of FIG. 8, since an OFDM symbol of the data field 1 840 and an OFDM symbol of a repeated data field 1 850 being a repeated version thereof may be generated to be the same as each other, processes to generate the two OFDM symbols may be equally performed by inserting all LGIs. An SGI may be uniformly inserted from a data field 2 860 being a first data OFDM symbol and a repeated data field 2 870 being a fourth data OFDM symbol.

Meanwhile, a PPDU format may be suggested where an LGI is not applied to an OFDM symbol of a repeated data field 1 850 being a second data OFDM symbol. That is, since an LGI 841a is applied to an OFDM symbol of a data field 1 840 being a first data OFDM symbol, a scheme of sharing a previous LGI 841a may be suggested without applying an LGI. Accordingly, an SGI may be collectively applied to an OFDM symbol with respect to fields after a data field 2 860 being a third data OFDM symbol. A format of the above PPDU may refer to FIG. 8(b).

Referring to a subfigure (b) of FIG. 8, an LGI 841b is applied to an OFDM symbol of the data field 1 840, and the OFDM symbol of the data field 1 840 includes data 1 842b. An LGI is not applied to an OFDM symbol of a repeated data field 1 850, and the OFDM symbol of a repeated data field 1 850 include repeated data 1 850b.

An SGI 861b is applied to an OFDM symbol of a data field 2 860, and the OFDM symbol of data field 2 860 includes data 2 862b. An SGI 871b is applied to an OFDM symbol of a repeated data field 2 870, and the OFDM symbol of a repeated data field 2 870 includes repeated data 2 872b.

According to a PPDU formation of the subfigure (a) of FIG. 8, lengths of first and second data OFDM symbols are the same as those of third and fourth data OFDM symbols. Time overhead corresponding to an LGI may be reduced as compared with a PPDU format of the subfigure (a) of FIG. 8. Further, OFDM symbols with respect to data fields are transmitted to have a predetermined time interval in two symbol units.

In addition, a PPDU format to which an SGI is not applied may be suggested with respect to a second repeated data OFDM symbol to which an existing SGI is applied. That is, in an OFDM symbol part to which the SGI is applied, the SGI is not applied to a repeated OFDM symbol. A format of the above PPDU may refer to a subfigure (c) of FIG. 8.

Referring to the subfigure (c) of FIG. 8, an LGI 841c is applied to an OFDM symbol of a data field 1 and the OFDM symbol of a data field 1 includes data 1 842c. An LGI is not applied to an OFDM symbol of a repeated data field 1 850, and the OFDM symbol of a repeated data field 1 850 include repeated data 1 850b.

An SGI 861c is applied to an OFDM symbol of a data field 2 860 and the OFDM symbol of a data field 2 860 includes data 2 862c. An SGI is not applied to an OFDM symbol of a repeated data field 2 870, and the OFDM symbol of a repeated data field 2 870 includes repeated data 2 870c.

According to a PPDU format of the subfigure (c) of FIG. 8, although lengths of first and second data OFDM symbols are the same as those of third and fourth data OFDM symbols, time overhead is significantly reduced.

Meanwhile, a scheme of applying the SGI shown in FIG. 8 is applicable to a format of a PPDU transmitted through a plurality of space streams.

Figure 9:
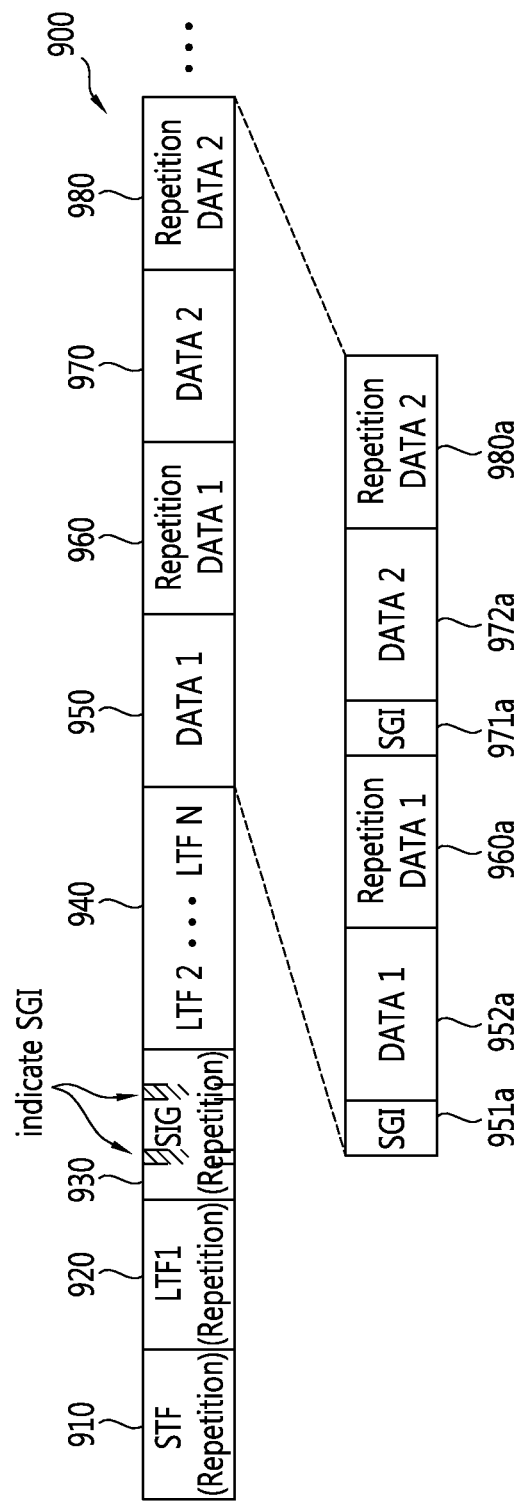
FIG. 9 is a block diagram illustrating another example of a PPDU for 1 MHz at a band of 1 GHz or less according to an embodiment of the present invention.

FIG. 9 is a block diagram illustrating another example of a PPDU for 1 MHz at a band of 1 GHz or less according to an embodiment of the present invention.

The PPDU shown in FIG. 9 is a PPDU form used to transmit a multi-stream through 1 MHz bandwidth in a next generation wireless LAN system.

Referring to FIG. 9, a PPDU 1000 includes a repeated STF 1010, an LTF1 1020, a repeated SIG field 1030, at least one LTF 1040, and at least one data field.

The shown PPDU is characterized by repeating an OFDM symbol. That is, the repeated STF 910, the repeated LTF1 920, and the repeated SIG field 930 may be formed by repeating OFDM symbol(s) composed of a bit sequence constituting original STF, LTF1, and SIG field as in the STF 610, the LTF1 620, and the SIG field 630 of FIG. 6. The STF and the LTF1 include four OFDM symbols obtained by repeating two OFDM symbols constituting the original STF and LTF1. Further, the repeated SIG field is formed by repeating OFDM symbols constituting the original SIG field.

Meanwhile, in the PPDU format for multi-stream transmission, at least one LTF 940 for estimating an MIMO channel is transmitted after transmission of the repeated SIG field 930, and then at least one data field is transmitted. Accordingly, when application of the SGI is indicated in an SIG field, a sufficient time capable of applying the SGI may be ensured at a data field. Accordingly, the SGI is applicable to a first data OFDM symbol. Further, the SIG may not be applied to the repeated OFDM symbol.

According to the scheme of applying the SGI, an SGI 951 is applied to an OFDM symbol of the data field 1 850, and the OFDM symbol of the data field 1 850 includes data 1 952. An SGI is not applied to an OFDM symbol of a repeated data field 1 960 and the OFDM symbol of a repeated data field 1 960 include repeated data 1 960.

An SGI 971 is applied to an OFDM symbol of a data field 2 970 and the OFDM symbol of a data field 2 970 includes data 2 972. The SGI is not applied to an OFDM symbol of a repeated data field 1 980 and the OFDM symbol of a repeated data field 1 980 include repeated data 2 980.

Hereinafter, a scheme of efficiently configuring a pilot sub-carrier in a PPDU for the above 1 MHz is suggested. Upon setting the pilot sub-carrier, the pilot value may be determined to be randomly changed to time/frequency axis. That is, time/frequency randomization may be performed by changing the pilot value according to a symbol index.

The pilot sub-carrier is configured in a following scheme in the conventional VHT LAN system.

1) 20 MHz Transmission

Four pilot tones may be inserted at a location of [−21, −7, 7, 21] in a sub-carrier index. A $P_n^k$ indicating pilot mapping of a k-th sub-carrier in an n-th symbol may be expressed by a following equation 2.

$$P_n^{\{-21,-7,7,21\}} = \{\Psi_{1,\,n\bmod 4}^{(1)}, \Psi_{1,\,(n+1)\bmod 4}^{(1)}, \Psi_{1,\,(n+2)\bmod 4}^{(1)}, \Psi_{1,\,(n+3)\bmod 4}^{(1)}\}$$

$$P_n^{k\notin\{-21,-7,7,21\}} = 0 \qquad [\text{Equation 2}]$$

In this case, the $\Omega_{1,m}^{(1)}$ may be specified as listed in a following table 3.

TABLE 3

| $\Psi_{1,0}^{(1)}$ | $\Psi_{1,1}^{(1)}$ | $\Psi_{1,2}^{(1)}$ | $\Psi_{1,3}^{(1)}$ |
|---|---|---|---|
| 1 | 1 | 1 | −1 |

2) 40 MHz Transmission

Six pilot tones may be inserted at a location of [−53, −25, −11, 11, 25, 53] in a sub-carrier index. A $P_n^k$ indicating pilot mapping of a k-th sub-carrier in an n-th symbol may be expressed by a following equation 3.

$$P_n^{\{-53,-25,-11,11,25,53\}} = \{\Psi_{1,\,n\bmod 6}^{(1)}, \Psi_{1,\,(n+1)\bmod 6}^{(1)}, \ldots, \Psi_{1,\,(n+5)\bmod 6}^{(1)}\}$$

$$P_n^{k\notin\{-53,-25,-11,11,25,53\}} = 0 \qquad [\text{Equation 3}]$$

In this case, the $\Omega_{1,m}^{(1)}$ may be specified as listed in a following table 4.

TABLE 4

| $\Psi_{1,0}^{(1)}$ | $\Psi_{1,1}^{(1)}$ | $\Psi_{1,2}^{(1)}$ | $\Psi_{1,3}^{(1)}$ | $\Psi_{1,4}^{(1)}$ | $\Psi_{1,5}^{(1)}$ |
|---|---|---|---|---|---|
| 1 | 1 | 1 | −1 | −1 | 1 |

3) 80 MHz Transmission

Eight pilot tones may be inserted at a location of [−103, −75, −39, −11, 11, 39, 75, 103] in a sub-carrier index. The $P_n^k$ indicating pilot mapping of a k-th sub-carrier in an n-th symbol may be expressed by a following equation 4.

$$P_n^{\{-103,-75,-39,-11,11,39,75,103\}} = \{\Psi_{1,\,n\bmod 8}, \Psi_{1,\,(n+1)\bmod 8}, \ldots, \Psi_{1,\,(n+7)\bmod 8}\}$$

$$P_n^{k\notin\{-103,-75,-39,-11,11,39,75,103\}} = 0 \qquad [\text{Equation 4}]$$

In this case, the $\Omega_{,m}$ may be specified as listed in a following table 5.

TABLE 5

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1 |

4) 160 MHz Transmission

160 MHz pilot mapping is performed based on duplication of pilot mapping of 80 MHz on two 80 MHz sub-bands of 160 MHz transmission. In detail, 16 pilot tones may be inserted at a location of [−231, −203, −167, −139, −117, −89, −53, −25, 25, 53, 89, 117, 139, 167, 203, 231] in a sub-carrier index. The $P_n^k$ indicating pilot mapping of a k-th sub-carrier in an n-th symbol may be expressed by a following equation 5.

$$P_n^{\{-231,-203,-167,-139,-117,-89,-53,-25,25,53,89,117,139,167,203,231\}} = \{\Psi_{n\bmod 8}, \Psi_{(n+1)\bmod 8}, \Psi_{(n+2)\bmod 8}, \Psi_{(n+3)\bmod 8}, \Psi_{(n+4)\bmod 8}, \Psi_{(n+5)\bmod 8}, \Psi_{(n+6)\bmod 8}, \Psi_{(n+7)\bmod 8}, \Psi_{n\bmod 8}, \Psi_{(n+1)\bmod 8}, \Psi_{(n+2)\bmod 8}, \Psi_{(n+3)\bmod 8}, \Psi_{(n+4)\bmod 8}, \Psi_{(n+5)\bmod 8}, \Psi_{(n+6)\bmod 8}, \Psi_{(n+7)\bmod 8}\}$$

$$P_n^{k\notin\{-231,-203,-167,-139,-117,-89,-53,-25,25,53,89,117,139,167,203,231\}} = 0 \qquad [\text{Equation 5}]$$

In this case, the $\Omega_{,m}$ may be specified as listed in the above table 5.

A scheme to configure a pilot sub-carrier in the VHT wireless LAN system is applicable to 2/4/8/16 MHz transmission of a next generation wireless LAN system based on a band of 1 GHz or less having 1/10 down-clock characteristic in the same manner. Meanwhile, in a case of 1 MHz transmission, since 32 tones are used, it may be considered that the pilot sub-carrier uses only 2 tones from 32 tones. In this case, only the down-click is not applicable to the scheme to configure the pilot sub-carrier of a VHT wireless LAN system. Accordingly, the present invention suggests the scheme to configure a pilot sub-carrier suitable for 1 MHz transmission by using only 2 tons as a pilot.

In a case of 1 MHz transmission, two pilot tones may be inserted at a location of [−7, 7] in a sub-carrier index. The $P_n^k$ indicating pilot mapping of a k-th sub-carrier in an n-th symbol may be expressed by a following equation 6.

$$P_n^{\{-7,7\}} = \{\Psi_{n\bmod 2}, \Psi_{(n+1)\bmod 2}\}$$

$$P_n^k = 0, \text{ for } k \neq -7 \text{ and } k \neq 7 \qquad [\text{Equation 6}]$$

In this case, the $\Omega_m$ may be specified as listed in a following table 6.

TABLE 6

| $\Psi_0$ | $\Psi_1$ |
|---|---|
| 1 | -1 |

Further, the $P_n^k$ may be expressed by a following equation 7 and a following table 7.

$$P_n^{k=\{-7,\,7\}} = \{\Psi_{(n \bmod 2)+2}, \Psi_{((n+1) \bmod 2)+2}\}$$

$$P_n^{k \notin \{-7,\,7\}} = 0 \quad \text{[Equation 7]}$$

TABLE 7

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | -1 | -1 | 1 | 1 | 1 |

If the foregoing scheme is applied, the pilot mapping has a form where 1 and -1 are inverted every OFDM symbol at tone -7 and 7 locations. In addition, instead of a scheme to use different pilot sub-carriers according to multi-streams in an HT wireless LAN system, phase tracking with low complexity may be possible by using one single-stream pilot value.

When a method of configuring the pilot sub-carrier at an OFDM symbol for a PPDU format for 1 MHz is applied, the method may be illustrated in FIG. 10.

FIG. 10 is a conceptual diagram illustrating a pilot sequence according to an OFDM symbol according to an embodiment of the present invention.

Referring to FIG. 10, since a corresponding OFDM symbol is a data OFDM symbol for 1 MHz PPDU transmission, the pilot may be inserted at locations of -7 and +7 in a sub-carrier index. Meanwhile, a pilot value may be changed according to which number of symbols is the corresponding OFDM symbol, that is, an index n of a corresponding OFDM symbol.

A subfigure (a) of FIG. 10 illustrates a pilot sequence according to an OFDM symbol when the OFDM symbol is repeated.

Referring to the subfigure (a) of FIG. 10, in a case of a first data symbol (n=0), a pilot 1010a located at a sub-carrier index -7 has +1, and a pilot 1020a located at a sub-carrier index 7 has -1. Meanwhile, in a case of a first data symbol (n=1), a pilot 1010a located at a sub-carrier index -7 has -1, and a pilot 1020a located at a sub-carrier index 7 has +1. In a case of a first data symbol (n=2), a pilot 1010a located at a sub-carrier index -7 has +1, and a pilot 1020a located at a sub-carrier index 7 has -1. Meanwhile, in a case of a first data symbol (n=1), a pilot 1010a located at a sub-carrier index -7 has -1, and a pilot 1020a located at a sub-carrier index 7 has +1.

A subfigure (a) of FIG. 10 illustrates a pilot sequence according to an OFDM symbol when the OFDM symbol is not repeated.

Referring to the subfigure (a) of FIG. 10, in a case of a first data symbol (n=0), a pilot 1010b located at a sub-carrier index -7 has +1, and a pilot 1020b located at a sub-carrier index 7 has -1. Meanwhile, in a case of a second data symbol (n=1), a pilot 1010b located at a sub-carrier index -7 has -1, and a pilot 1020b located at a sub-carrier index 7 has +1. Further, in a case of a third data symbol (n=2), a pilot 1010a located at a sub-carrier index -7 has +1, and a pilot 1020a located at a sub-carrier index 7 has -1. Meanwhile, in a case of a fourth data symbol (n=3), a pilot 1010a located at a sub-carrier index -7 has -1, and a pilot 1020a located at a sub-carrier index 7 has +1.

Meanwhile, a line of a specific frequency component may be generated at a time domain axis due to a configuration of the above pilot sub-carrier. The unintended spectral line generates a signal beyond a dynamic range at a frequency domain to deteriorate performance during digital domain processing. In order to prevent this, scrambling is applicable to a pilot value in an OFDM symbol unit. In this case, the same scrambling value is applicable in one OFDM symbol, and the scrambling value may be changed and applied in an OFDM symbol. A scrambling code being a group of the applied scrambled values may be a pseudo random sequence.

For example, a scrambling code $p_n$ is applicable to a pilot value $P_n^k$ according to an OFDM symbol index n and a sub-carrier index k according to an OFDM symbol index. Accordingly, a final pilot sequence value may be expressed by $P_n^k \cdot p_{n+\delta}$. The $\delta$ may be an applicable offset value when control of the scrambling value applied to a specific pilot value is required. Application of the offset value will be described later.

The scrambling sequence $p_n$ may be implemented by performing cyclic extension for a sequence having 127 bit length as illustrated in a following equation 8.

$$p_{0\,\ldots\,126} = \{1, 1, 1, 1, -1, -1, -1, 1, -1, -1, -1, -1,$$
$$1, 1, -1, 1, -1, 1, 1, -1, 1, 1, -1, 1, 1, 1, 1,$$
$$1, 1, -1, 1, 1, 1, -1, 1, 1, -1, -1, 1, 1, 1, -1, 1,$$
$$-1, -1, -1, 1, -1, 1, -1, -1, 1, -1, -1, 1, 1, 1,$$
$$1, 1, -1, -1, 1, 1, -1, -1, 1, -1, 1, 1, 1, 1, -1,$$
$$-1, -1, 1, 1, -1, -1, -1, 1, -1, 1, -1, 1, -1, 1,$$
$$1, 1, 1, -1, 1, -1, 1, -1, 1, -1, -1, -1, -1, -1,$$
$$1, -1, 1, 1, -1, 1, -1, 1, 1, 1, -1, -1, 1, -1, -1,$$
$$-1, 1, 1, 1, -1, -1, -1, -, -1, -1, -\} \quad \text{[Equation 8]}$$

Figure 11:
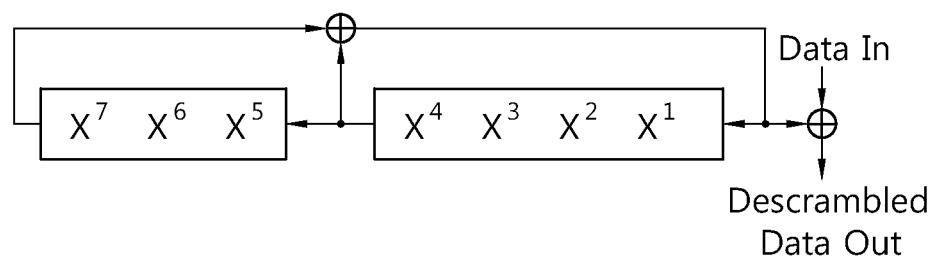
FIG. 11 is a diagram illustrating an example of a polynomial generator being a base to generate a scrambling sequence according to an embodiment of the present invention

The above scrambling sequence may be generated by a polynomial generator as shown in FIG. 11.

FIG. 11 is a diagram illustrating an example of a polynomial generator being a base to generate a scrambling sequence according to an embodiment of the present invention.

In the polynomial generator shown in FIG. 11, when all values are initialized to '1' and a generated binary value is 0, '1' is generated. When the generated binary value is 1, '-1' is generated, which may be considered as an equivalent value to generate the above pseudo random sequence.

In general, a scrambling sequence $p_n$ is applied all pilots of at least one signal symbol with an SIG field and at least one DATA symbol with respect to a DATA field. In this case, the symbol index n may be a value independently counted for symbols with respect to an SIG field and symbols with respect to a DATA field. For example, when the number of signal symbols is 2, an index nSIG of each OFDM symbol for the SIG field is 0, 1, that is, $n_{SIG}=0, 1$. A data symbol is transmitted after the signal symbol, but may be independently counted like a symbol index $n_{DATA}=0, 1, 2 \ldots$. In this case, when a data symbol index is n, a scrambling value applied to a corresponding symbol may be expressed by $p_{n+2}$. This is because a symbol counting for the scrambling sequence counts all of the signal symbol and the data symbol. In $P_n^k \cdot p_{n+\delta}$ indicating that at a scrambling value is applied to a pilot value of a specific symbol, the $\delta$ may be considered as an offset value associated with symbol index counting with respect to an SIG field.

In the above example, the symbol indexing is independently counted with respected to a signal symbol and a data symbol. Accordingly, for continuity of the scrambling value, the offset value is applied, but the pilot value does not have the continuity because the offset value is not applied. However, when the offset value is applied in the pilot value, it is apparent that the offset value may have the continuity. Further, a scheme of continuously counting the symbol index with respect to the signal symbol and the data symbol may be suggested. In this case, if the offset value is not applied, all of the scrambling value and the pilot value may have the continuity.

Meanwhile, introduction of a next generation wireless LAN system requires to consider a phenomenon capable of being generated when implementing a wireless LAN system in an outdoor environment. For example, in an outdoor wireless LAN system, an STA has mobility so that a wireless environment may be changed. For example, the change of the wireless channel due to Doppler frequency shift may be considered. In order to compensate for this, a midamble is applicable to the PPDU.

Figure 12:
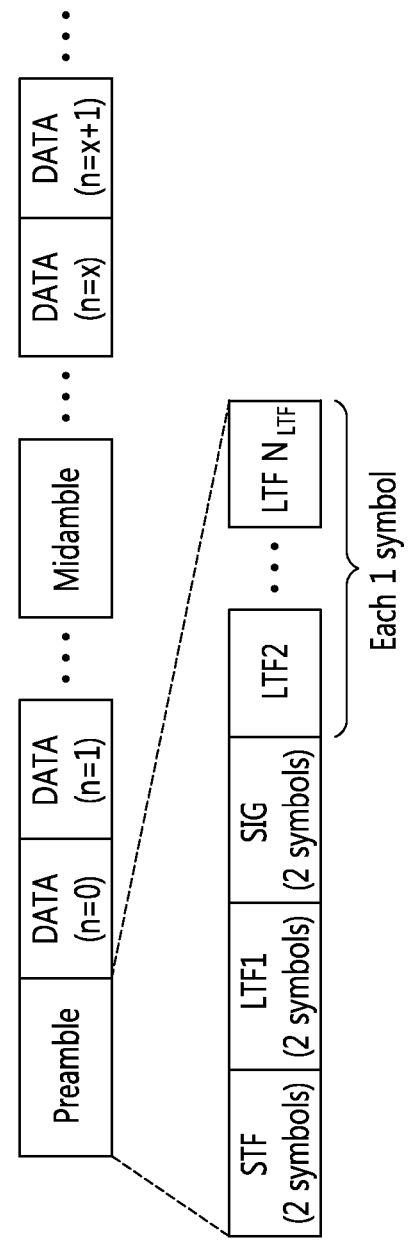
FIG. 12 is a block diagram illustrating an example of a PPDU format to which a midamble is applied according to an embodiment of the present invention.

FIG. 12 is a block diagram illustrating an example of a PPDU format to which a midamble is applied according to an embodiment of the present invention.

The PPDU shown in FIG. 12 includes a PPDU formation used for transmission through a 1 MHz channel bandwidth in a next generation wireless LAN system.

Referring to FIG. 12, the PPDU includes a preamble, at least one data symbol, and a midamble. In this example, since the number of symbols for the SIG field is two, an offset $\delta$ may be 2.

The difference from the PPDU formation is that the midamble is transmitted after a plurality of data symbols are transmitted after the preamble. After transmission of the midamble, remaining data symbols are transmitted.

A structure of the midamble may be implemented by following four schemes.

1. Case of having the same structure as that of the preamble
2. Case where the preamble is smaller than the overhead, that is, the number of OFDM symbols for the midamble is implemented to be smaller than the number of OFDM symbols
3. Case where the preamble is larger than the overhead, that is, the number of OFDM symbols for the midamble is implemented to be larger than the number of OFDM symbols
4. Case implemented as an independent structure from the preamble Hereinafter, a method of transmitting a data unit according to an embodiment of the present invention will be described when a PPDU including the midamble implemented by the 1 is an example of the data unit. However, it will be apparent that the spirit and scope of the present invention is applicable to other cases.

As described above, a symbol index n is independently counted with respect to signal symbols and data symbols. Accordingly, since data symbols with respect to the data field are continuously transmitted after the preamble, the applied scrambling value may have a continuity with respect to the scrambling value because it is determined based on a symbol index with respect to the data symbol.

Meanwhile, when the midamble is applied to the data unit, data symbols with respect to the data field may not be continuously transmitted. In this case, when an existing symbol indexing method and the scrambling value are applied as it is, scrambling values applied to a signal symbol of the midamble and data symbols which are transmitted afterward may not have the continuity. This is because an index with respect to the signal symbol and an index with respect to the data symbol are independently counted. Accordingly, there is a need for a scheme capable of maintaining continuity of the scrambling values in the method of transmitting a data unit to which the midamble is applied.

As a symbol indexing scheme for a method of transmitting the data unit to which the midamble is applied, 1) a scheme of initializing indexing from a midamble interval, 2) a scheme of indexing including the midamble interval, and 3) a scheme of indexing to omit the midamble interval.

First, a method of transmitting the data unit according to a scheme of indexing a symbol from the midamble interval will be described. The method of transmitting the data unit will be described with reference to FIG. 13.

Figure 13:
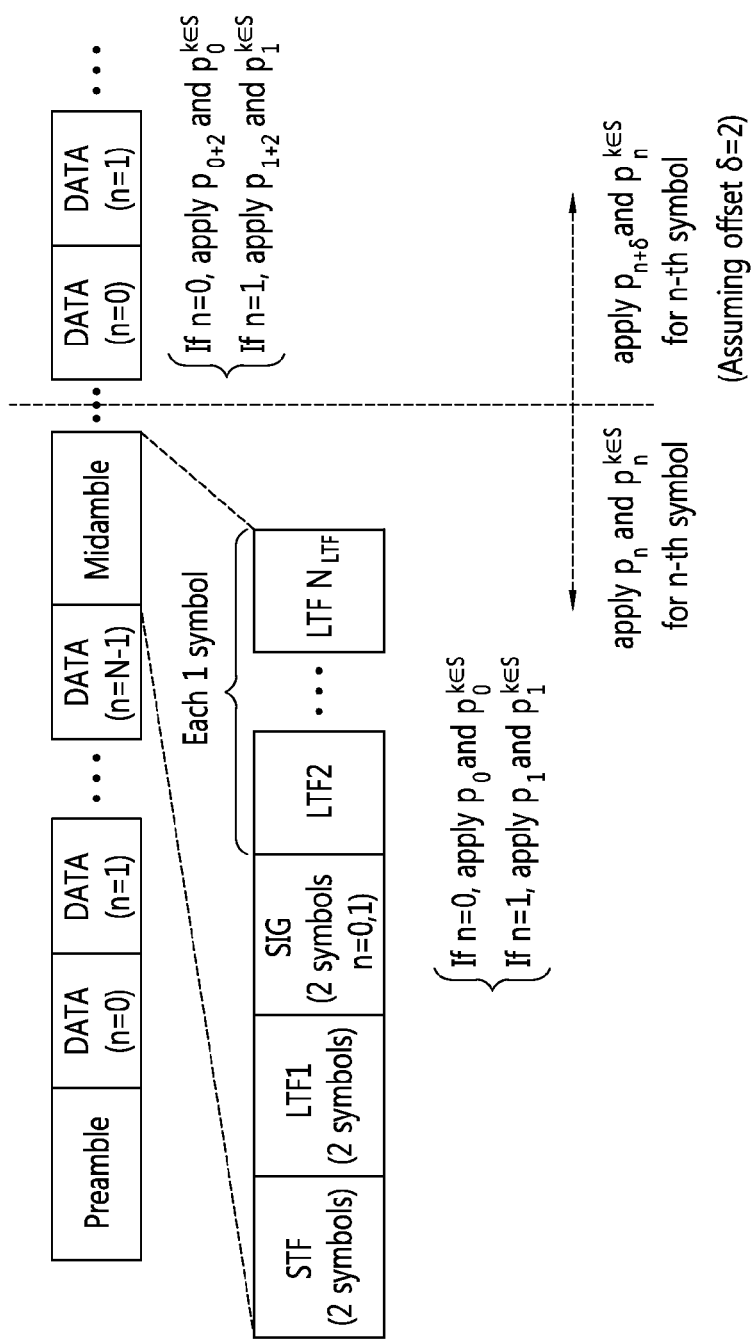
FIGS. 13-15 are diagrams illustrating examples of a method of transmitting the data unit to which the midamble is applied according to a first embodiment of the present invention.

FIG. 13 is a diagram illustrating an example of a method of transmitting the data unit to which the midamble is applied according to a first embodiment of the present invention.

The method of transmitting the data unit shown in FIG. 13 initializes symbol indexing from the midamble interval.

Referring to FIG. 13, after transmission of the preamble, at least one data symbol is transmitted. Accordingly, after the transmission of the midamble, at least one remaining data symbol is transmitted. When the OFDM system is transmitted in the transmission order, a symbol index n is initialized at a midamble interval. An index n of a signal symbol with respect to an SIG field of the midamble becomes 0, 1. The signal symbols with respect to the midamble are transmitted by applying p0, p1 to the scrambling value and applying P0k, P1k to the pilot value.

The symbol index for at least one data symbol transmitted after the midamble is again initialized. However, so as to maintain the continuity with respect to the applied scrambling values, the scrambling values may be determined based on a value of the offset applied to a corresponding to a symbol index. An index n of a symbol with respect to a remaining data field is set as 0, 1, . . . . Accordingly, the symbols with respect to the remaining data field is transmitted by applying p0+2, p1+2 . . . to the scrambling value and applying P0k, P1k, . . . to the pilot value.

As a result, the scrambling value pn and the pilot value Pnk are applied to the signal symbol of the midamble, and a scrambling pn+$\delta$ and the pilot value Pnk are applied to a data symbol after the midamble. In this case, the n is an independent indexing value in a symbol with an SIG field and a symbol with a data field. It may be understood that the scrambling value has a continuity of symbols with respect to the SIG field and the data field by applying the offset $\delta$.

Meanwhile, the symbol indexing is initialized based on the midamble, and pilot values as well as scrambling values applied to a symbol with respect to the SIG field and the data field have a continuity.

Figure 14:
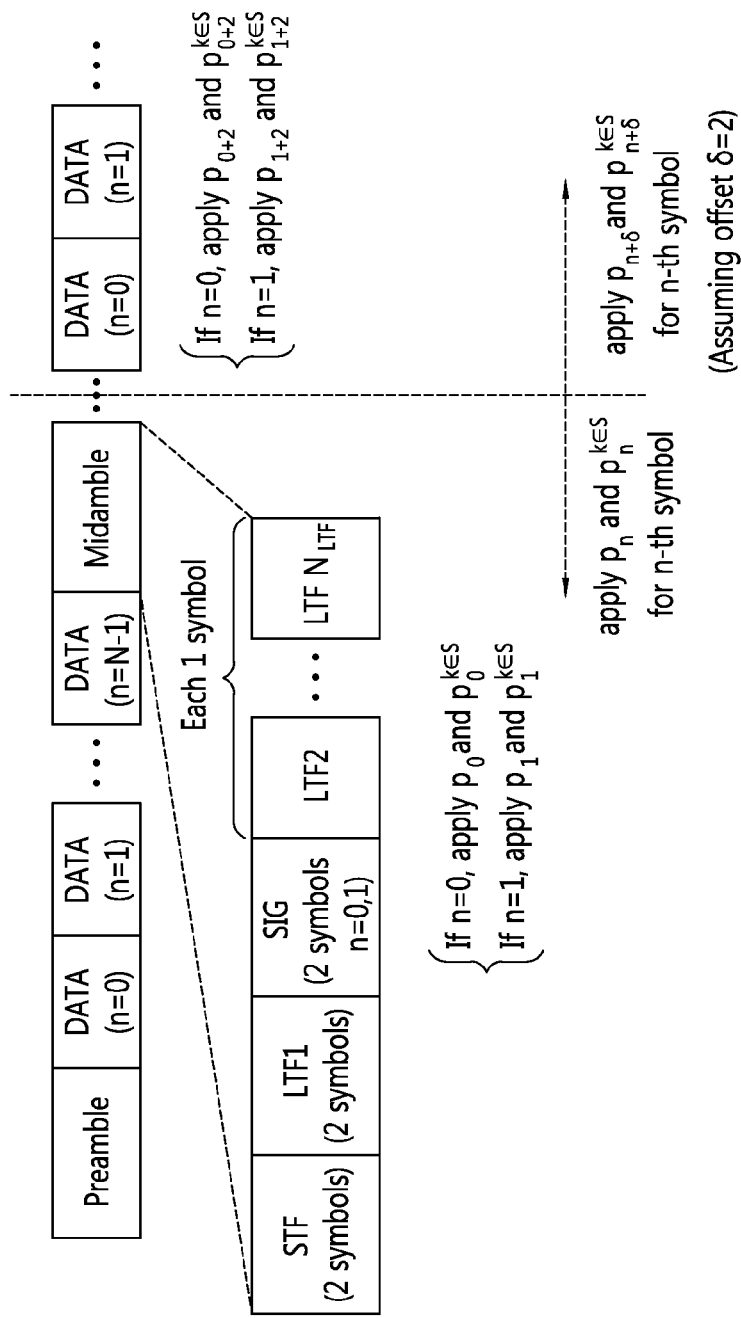

FIG. 14 is a diagram illustrating another example of a method of transmitting a data unit to which the midamble is applied according to a first embodiment of the present invention.

In the method of transmitting the data unit shown in FIG. 14, symbol indexing is initialized from a midamble interval, a pilot value and a scrambling value applied to symbols of an SIG field of the midamble and a next transmitted data field have the continuity.

Accordingly, the scrambling value pn and the pilot value Pnk are applied to the signal symbol of the midamble, and a scrambling value pn+$\delta$ and a pilot value Pn+$\delta$k are applied to a symbol with respect to a data field after the midamble. In this case, the n is an index value obtained by independently counting the signal symbol and the data symbol. An offset δ is applied to determine the scrambling value and the pilot value for the data symbol so that the continuity of the pilot value and the scrambling value may maintain.

Figure 15:
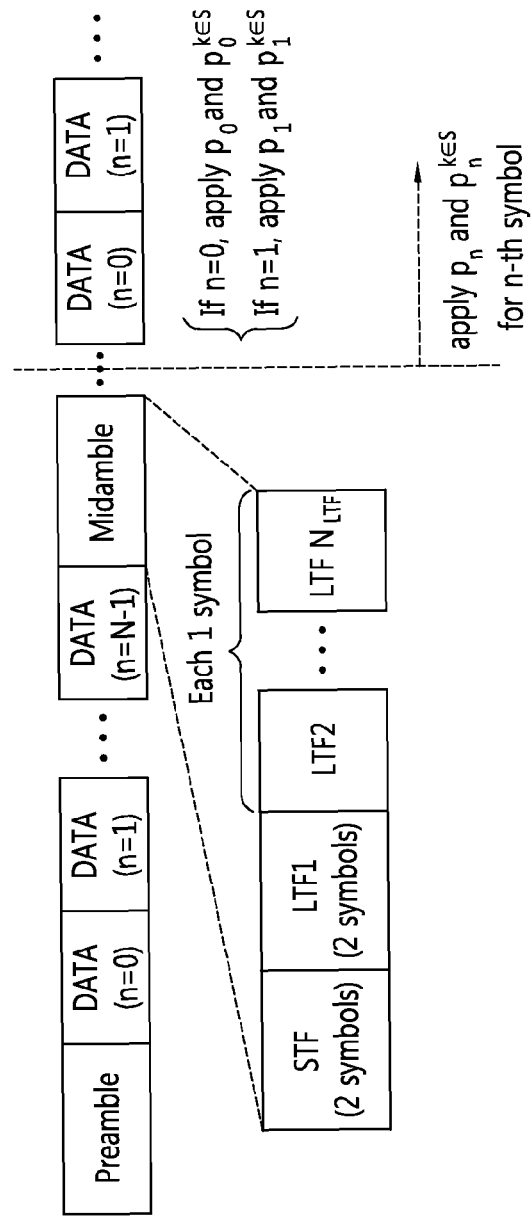

In addition, when the midamble does not include the SIG field unlike the preamble, the pilot value and the scrambling value applied to the symbol are determined by only an index value of a corresponding symbol. In examples of FIGS. 13 and 14, this is because the offset δ means the offset is set to 0 when the number of symbols with respect to an SIG filed of the midamble, and the SIG field is not included in the midamble. In this case, the pilot value and the scrambling value applied to each OFDM symbol may refer to an example of the method of transmitting the data unit shown in FIG. 15.

According to the method of transmitting the data unit, the signal symbol for the SIG field and the data symbol for the data field are independently indexed. Accordingly, the previously transmitted signal symbols and data symbols, next transmitted signal symbols and data symbols are independently indexed. Meanwhile, a scheme of continuously index-counting transmitted signal symbols and data symbols regardless of a start interval of the midamble. The scheme will be described with reference to the accompanying drawings.

Figure 16:
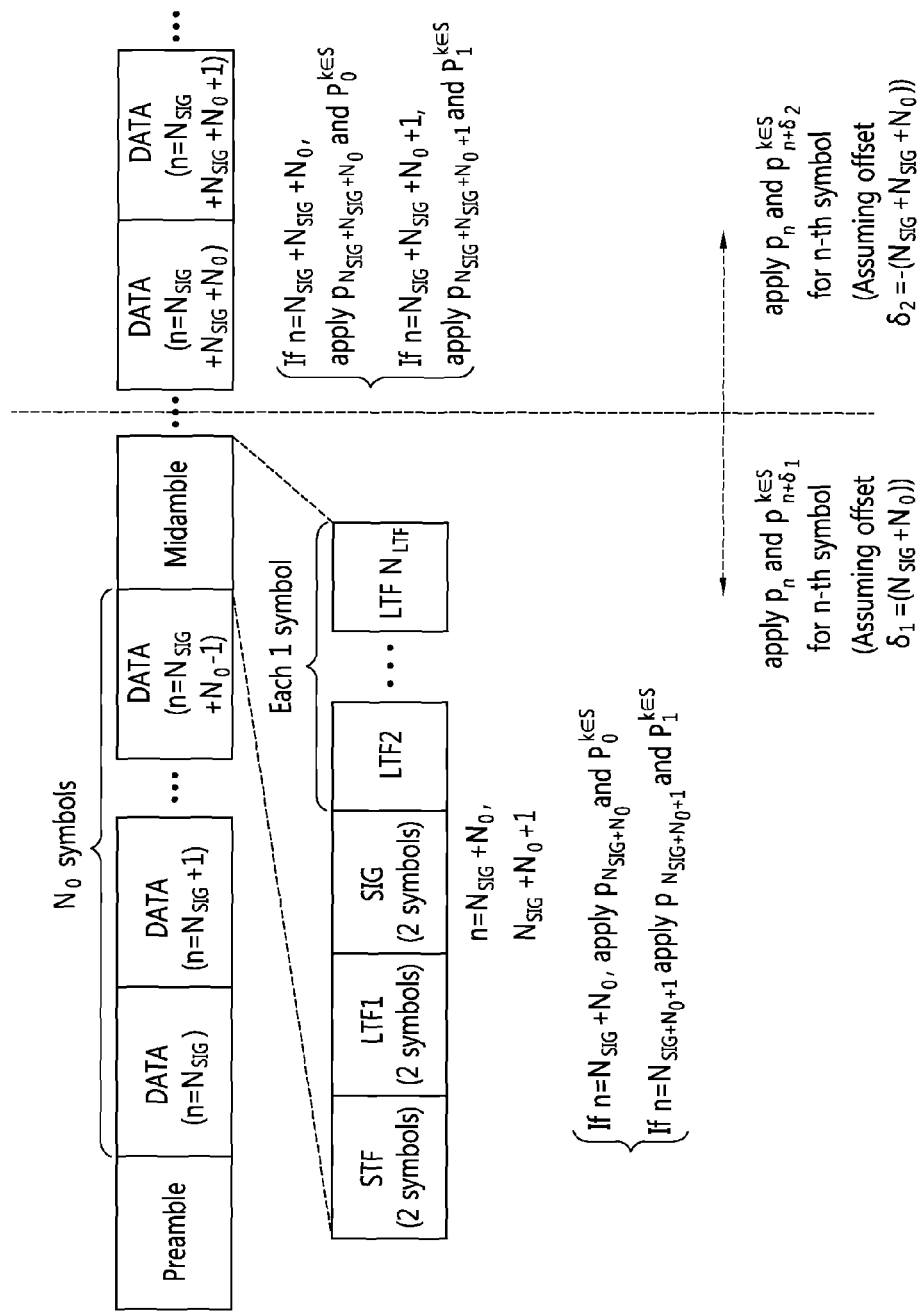
FIGS. 16 and 17 are diagrams illustrating examples of a method of transmitting the data unit to which the midamble is applied according to a second embodiment of the present invention.

FIG. 16 is a diagram an example of a method of transmitting a data unit to which the midamble is applied according to a second embodiment of the present invention.

Unlike an example of FIG. 13, in the method of transmitting the data unit shown in FIG. 16, a continuous indexing is applied to OFDM symbols regardless of a midamble.

Referring to FIG. 16, after transmission of the preamble, at least one data symbol is transmitted. Next, after the transmission of the midamble, at least one remaining data symbol is transmitted. When the OFDM symbol is transmitted in the above transmission order, the symbol index may be counted from the signal symbol with respect to an SIG field of the preamble. After the preamble, at least one data symbol with respect to the data field is transmitted. In this example, since an SIG field of the preamble may be transmitted through two signal symbols, an index n of a signal symbol of the preamble may be set to 0, 1.

An index of the data symbol may be counted after a signal symbol index of the preamble. Index n of corresponding data symbols may be sequentially set to a value of $N_{SIG}$ to $N_{SIG}+N_0-1$ on the assumption that the number of data symbols transmitted between the preamble and the midamble is $N_0$. In this case, the $N_{SIG}$ represents the number of signal symbols of the preamble.

After transmission of at least one data symbol, the midamble is transmitted. Since it is assumed that the midamble has the same structure as that of the preamble, an SIG field of the midamble may be transmitted through two signal symbols. An index of the signal symbol of the midamble may be counted after a previously transmitted data symbol. Accordingly, an index n of a symbol for an SIG field of the preamble may be set to $N_{SIG}+N_0$, $N_{SIG}+N_0+1$. Meanwhile, in order to satisfy the continuity of the scrambling value applied to the symbol, scrambling values $p_{NSIG+N0}$, $p_{NSIG+N0+1}$ are applied to the signal symbol of the midamble. Meanwhile, since the pilot value is not required to maintain the continuity and is independently applicable with respect to the signal symbol and the data symbol, pilot values P0k, P1k are applied to the signal symbol of the midamble.

At least one data symbol is transmitted after the midamble. An index of a corresponding data symbol may be counted after a signal symbol of the midamble. Accordingly, an index n of data symbols may be set to $N_{SIG}+N_{SIG}+N_0$, $N_{SIG}+N_{SIG}+N_0+1$, . . . . Meanwhile, in order to maintain the continuity of a scrambling value applied to the symbol, scrambling values $p_{NSIG+NSIG+N0}$, $p_{NSIG+NSIG+N0+1}$, . . . are applied to the data symbol. Meanwhile, the continuity of the pilot value is not necessary to maintain and is independently applicable to the signal symbol and the data symbol, the pilot value $P_0^k$, $P_1^k$, . . . , is applied to the data symbol.

As a result, a scrambling value $p_n$ and a pilot value $P_{n+\delta 1}^k$ are applied to a signal symbol of the midamble, and a scrambling value $P_{n+\delta 2}^k$ is applied to a symbol with respect to a data field after the midamble. In this case, the n is a continuously counted index value with respect to the signal symbol and the data symbol. Accordingly, the continuity may maintain to apply the scrambling value. Meanwhile, in the application of the pilot value, independence between symbols with respect to the SIG field and symbols with respect to the data field may maintain by applying each offset $\delta_1$ and $\delta_2$. In this example, the $\delta_1$ may be set to $-(N_{SIG}+N_0)$, and the δ2 may be set to $-(N_{SIG}+N_{SIG}+N_0)$.

In addition, when the midamble does not include the SIG field unlike the preamble, the midamble may be determined based on a symbol index value and an adjusted offset value due to the pilot value. In this case, the pilot value and the scrambling value applied to each OFMD symbol may refer to FIG. 17.

Figure 17:
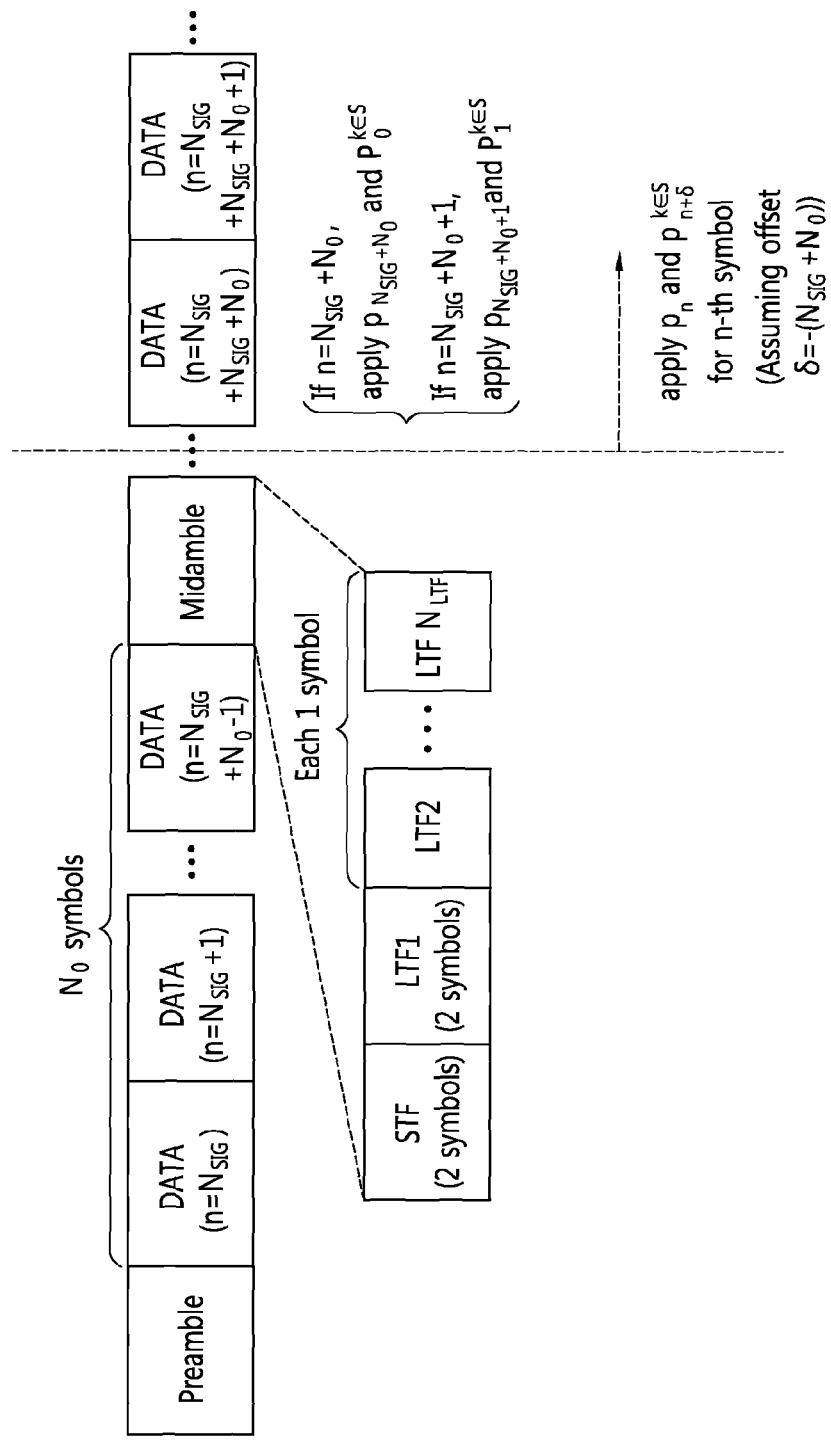

According to the method of transmitting a data unit shown in FIGS. 16 and 17, a scrambling value applied to signal symbols and data symbols has the continuity. The applied pilot value has independence. Meanwhile, a method of transmitting a data unit may be implemented to maintain the continuity of a scrambling value and a pilot value applied to the signal symbols and data symbols. This may refer to FIG. 18.

Figure 18:
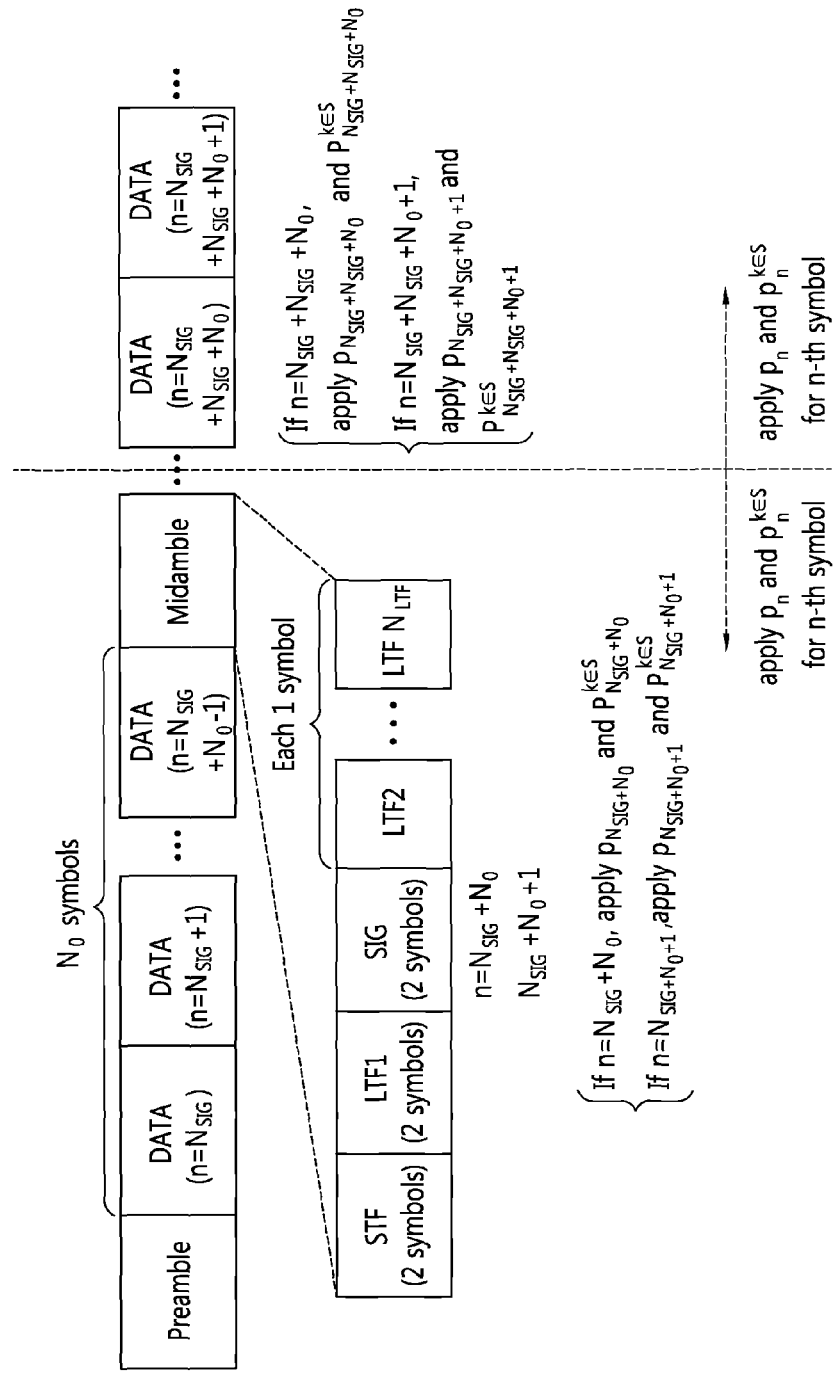
FIGS. 18 and 19 are diagrams illustrating examples of a method of transmitting the data unit to which the midamble is applied according to a third embodiment of the present invention.

FIG. 18 is a diagram illustrating another example of a method of transmitting a data unit to which the midamble is applied according to a third embodiment of the present invention.

Similar to FIG. 16, in the method of transmitting a data unit shown in FIG. 18, continuous indexing is applied to an OFDM symbol regardless of a midamble interval. However, unlike FIG. 16, scrambling values and pilot values applied to symbols have the continuity.

Referring to FIG. 18, it may be understood that symbol indexing is continuously set to signal symbols with respect to a SIG field of a preamble, data symbols with respect to a data field transmitted after the preamble, signal symbols with respect to an SIG field of the preamble, and data symbols with respect to a next transmitted data field. Further, it may be understood that the scrambling value and the pilot value applied to each symbol are $p_n$ and $P_n^k$, respectively. Accordingly, in this example, it may be understood that the scrambling values and the pilot values applied to the symbol have the continuity.

Figure 19:
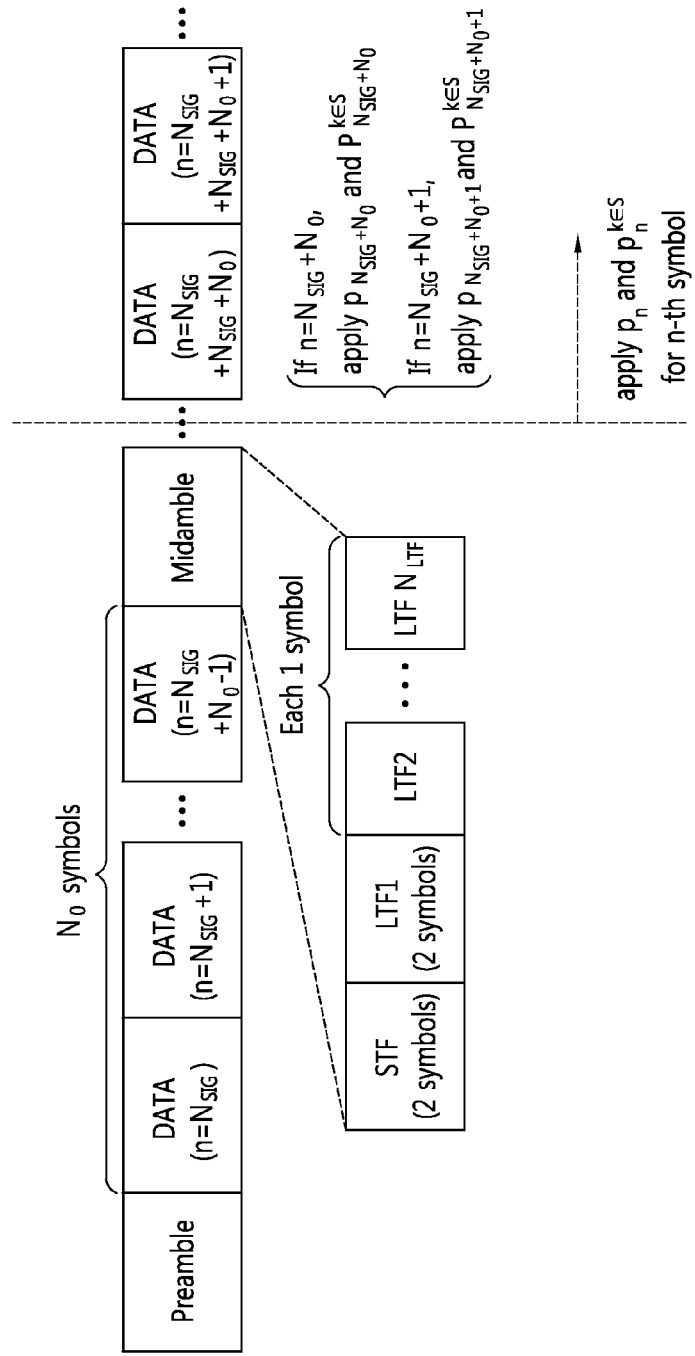

In addition, the midamble may include the SIG field unlike the preamble. This case may refer to FIG. 19.

In the method of transmitting the data unit according to an embodiment of the present invention, a scrambling sequence is applied to a pilot tone of a transmitted OFDM symbol. Accordingly, a line of a specific frequency component may be prevented from being generated to a time domain axis so that performance by the line may be prevented from being degraded.

Further, when the midamble is included in the data unit in order to compensate for a channel change due to a Doppler frequency shift, a pilot value and a scrambling sequence are applied to a transmitted data unit for SIG fields and a data field included in the data unit upon transmission of the data unit. Accordingly, unlike an existing data unit, the performance can be prevented and the whole performance of a wireless LAN can be improved by applying a suitable scrambling sequence to the data unit including the midamble.

Figure 20:
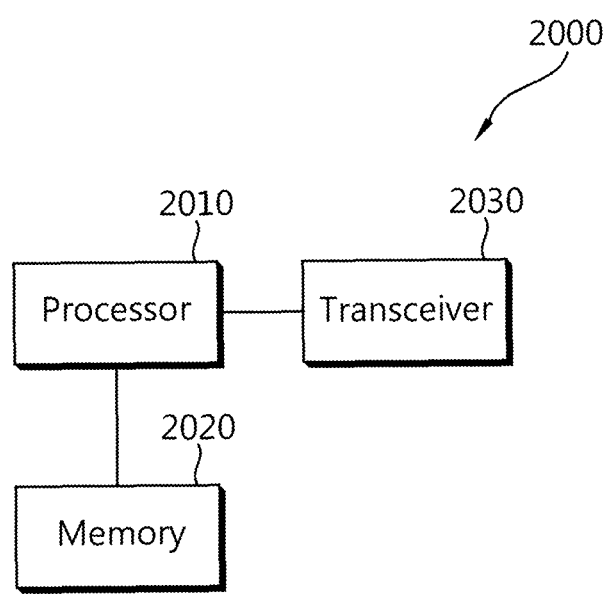
FIG. 20 is a block diagram illustrating a wireless device to implement embodiments of the present invention.

FIG. 20 is a block diagram illustrating a wireless device to implement embodiments of the present invention.

Referring to FIG. 20, a wireless device 2000 includes a processor 2010, a memory 2020, and a transceiver 2030. The transceiver 2030 transmits and/or receives a wireless signal, and implements a physical layer of IEEE 802.11. The processor 2010 may be functionally connected to the transceiver 2030 to be operated. The processor 2010 may generate a data unit of a format according to an embodiment of the present invention, and generate and transmit a corresponding OFDM symbol. The processor 210 may transmit the data unit by inserting a pilot tone not a symbol according to the embodiment of the present invention with reference to FIGS. 11 to 19. The processor 201 may be configured to implement an embodiment according to the accompanying drawings.

The processor 2010 and the transceiver 2030 may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory 2020 and executed by the processor 2010. The memory 2020 may be disposed to the processor 2010 internally or externally and connected to the processor 2010 using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting data in a wireless local area network, the method comprising:
generating, by a transmitter, a physical layer protocol data unit (PPDU) including a short training field, a long training field, a signal field and a data field carrying a physical layer service data unit (PSDU); and
transmitting, by the transmitter, the PPDU over a 1 MHz bandwidth,
wherein the data field is transmitted in a plurality of orthogonal frequency division multiplexing (OFDM) symbols, and
wherein pilots for the data field are mapped in the plurality of OFDM symbols as follows:

$$P_n^{k=\{-7,7\}} = \{\Psi_{(n \bmod 2)+2}, \Psi_{((n+1) \bmod 2)+2}\} \text{ and } P_n^k = 0$$

when k is neither 7 nor −7,
where $P_n^k$ denotes a pilot value at subcarrier k for OFDM symbol n, n=0, . . . , N−1, N is the number of the plurality of OFDM symbols, 'mod' denotes modulo operation, and $\Psi_m$ is given in a following table:

| $\Psi_2$ | $\Psi_3$ |
|---|---|
| 1 | −1. |

2. The method of claim 1, wherein the short training field is transmitted in 4 first OFDM symbols and the long training field is transmitted in 4 second OFDM symbols that are subsequent to the 4 first OFDM symbols.

3. The method of claim 2, wherein the signal field is transmitted in 6 third OFDM symbols that are subsequent to the 4 second OFDM symbols.

4. The method of claim 3, wherein the plurality of OFDM symbols for the data field are subsequent to the 6 third OFDM symbols.

5. A device configured for transmitting data in a wireless local area network, the method comprising:
a transceiver configured to receive and transmit radio signals; and
a processor operatively coupled with the transceiver and configured to:
generate a physical layer protocol data unit (PPDU) including a short training field, a long training field, a signal field and a data field carrying a physical layer service data unit (PSDU); and
instruct the transceiver to transmit the PPDU over a 1 MHz bandwidth,
wherein the data field is transmitted in a plurality of orthogonal frequency division multiplexing (OFDM) symbols, and
wherein pilots for the data field are mapped in the plurality of OFDM symbols as follows:

$$P_n^{k=\{-7,7\}} = \{\Psi_{(n \bmod 2)+2}, \Psi_{((n+1) \bmod 2)+2}\} \text{ and } P_n^k = 0$$

when k is neither 7 nor −7,
where $P_n^k$ denotes a pilot value at subcarrier k for OFDM symbol n, n=0, . . . , N−1, N is the number of the plurality of OFDM symbols, 'mod' denotes modulo operation, and $\Psi_m$ is given in a following table:

| $\Psi_2$ | $\Psi_3$ |
|---|---|
| 1 | −1. |

6. The device of claim 5, wherein the short training field is transmitted in 4 first OFDM symbols and the long training field is transmitted in 4 second OFDM symbols that are subsequent to the 4 first OFDM symbols.

7. The device of claim 6, wherein the signal field is transmitted in 6 third OFDM symbols that are subsequent to the 4 second OFDM symbols.

8. The device of claim 7, wherein the plurality of OFDM symbols for the data field are subsequent to the 6 third OFDM symbols.

* * * * *